(12) United States Patent
Yano et al.

(10) Patent No.: US 6,590,704 B1
(45) Date of Patent: Jul. 8, 2003

(54) MULTI-EYE IMAGE SENSING APPARATUS

(75) Inventors: Kotaro Yano, Yokohama (JP); Keisuke Araki, Yokohama (JP); Toshihiro Sunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,938

(22) Filed: Jun. 25, 1999

(30) Foreign Application Priority Data

Jun. 29, 1998 (JP) ............................................. 10-196471
Sep. 29, 1998 (JP) ............................................. 10-290139

(51) Int. Cl.[7] ............................................. G02B 27/22
(52) U.S. Cl. ........................ 359/466; 359/471; 396/324
(58) Field of Search ................................. 359/466, 633, 359/471, 473, 725; 396/322, 324, 325, 326, 327, 333, 323, 331; 353/7, 81; 348/38

(56) References Cited

U.S. PATENT DOCUMENTS

| 5,581,314 A | 12/1996 | Yoneyama et al. | ......... 396/331 |
|---|---|---|---|
| 5,699,108 A | 12/1997 | Katayama et al. | ............ 348/47 |
| 5,727,239 A | 3/1998 | Hankawa et al. | ........... 396/111 |
| 5,905,848 A | 5/1999 | Yano et al. | ................. 386/117 |
| 5,937,212 A | 8/1999 | Kurahashi et al. | ............. 396/20 |
| 6,014,261 A | * 1/2000 | Takahashi | .................... 359/633 |
| 6,166,866 A | * 12/2000 | Kimura et al. | ............... 359/729 |

FOREIGN PATENT DOCUMENTS

| EP | 0 788 003 | 8/1997 |
|---|---|---|
| EP | 0 825 466 | 2/1998 |
| JP | 8-292371 | 11/1996 |
| JP | 8-292372 | 11/1996 |
| JP | 9-5650 | 1/1997 |

\* cited by examiner

*Primary Examiner*—Mark A. Robinson
*Assistant Examiner*—Lee Fineman
(74) *Attorney, Agent, or Firm*—Fitzpatrick, Cella, Harper & Scinto

(57) ABSTRACT

In a multi-eye camera head unit (10), a panoramic image sensing exchangeable camera head unit (111) and three-dimensional image sensing exchangeable camera head unit (112) are exchanged in correspondence with the image sensing mode. The panoramic image sensing exchangeable camera head unit (111) includes a pair of optical elements (111R, 111L), which comprise offaxial optical systems each having a plurality of reflecting and refracting surfaces. The three-dimensional image sensing camera head unit (112) includes a pair of optical elements (112R, 112L), which comprise offaxial optical systems each having a plurality of reflecting and refracting surfaces.

18 Claims, 28 Drawing Sheets

FIG. 13A
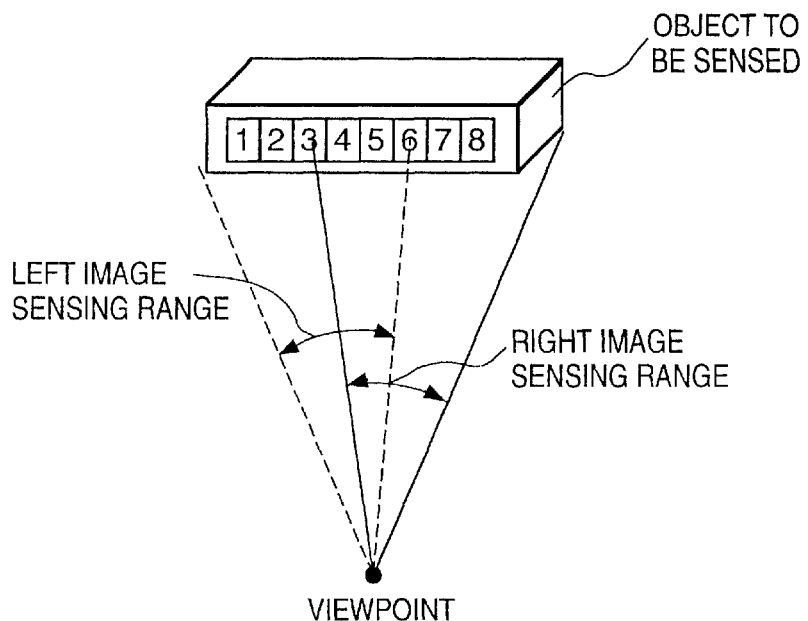
OBJECT TO BE SENSED
LEFT IMAGE SENSING RANGE
RIGHT IMAGE SENSING RANGE
VIEWPOINT
FIG. 13B
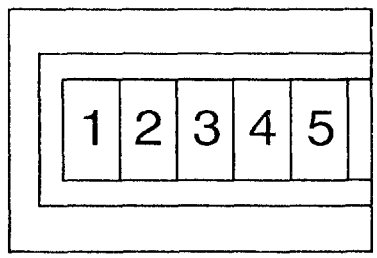
LEFT IMAGE
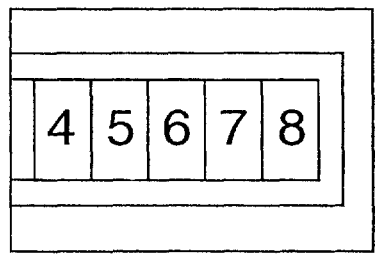
RIGHT IMAGE
FIG. 13C
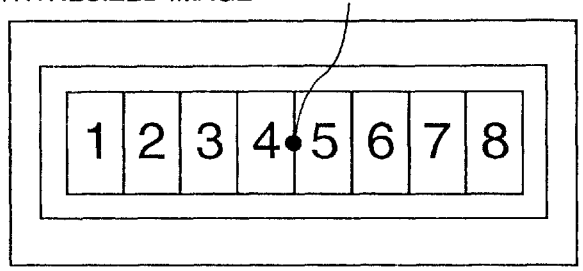
SYNTHESIZED IMAGE
APPARENT CENTRAL VIEWPOINT OF SYNTHESIZED IMAGE

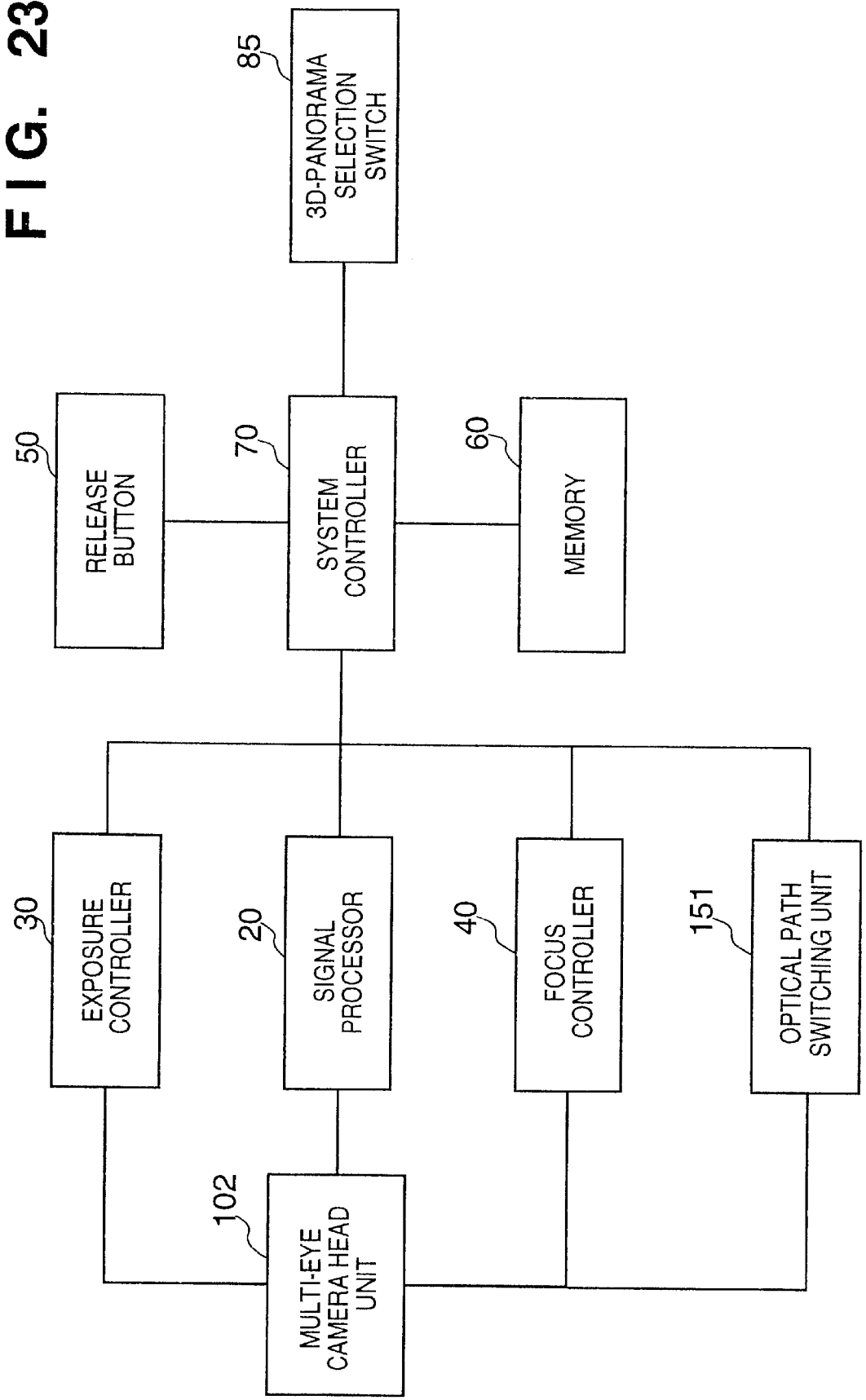

OBJECT TO BE SENSED

LEFT IMAGE SENSING RANGE

RIGHT IMAGE SENSING RANGE

VIEWPOINT

LEFT IMAGE

RIGHT IMAGE

LEFT IMAGE "CENTRAL VIEWPOINT"   RIGHT IMAGE "CENTRAL VIEWPOINT"

IDEALLY SYNTHESIZED IMAGE

"CENTRAL VIEWPOINT" OF IDEALLY SYNTHESIZED IMAGE

MULTI-EYE IMAGE SENSING APPARATUS

BACKGROUND OF THE INVENTION

1. Field of the Invention

The present invention relates to a multi-eye image sensing apparatus having a plurality of image sensing systems.

2. Description of Related Art

Conventionally, as a method of sensing a three-dimensional image of an object, a method using a multi-eye image sensing apparatus having a plurality of image sensing optical systems is known. In this image sensing method, an object is sensed using a plurality of image sensing systems, e.g., two, right and left image sensing systems, and the three-dimensional shape of the object is recognized by disparity produced between the right and left image portions of the object sensed by the right and left image sensing systems. Such three-dimensional shape recognition works in basically the same way a person recognizes the shape of an object as a three-dimensional shape due to disparity produced upon capturing the object by the right and left eyes.

In image sensing using the multi-eye image sensing apparatus, the base length (spacing between the right and left image sensing systems) and convergence angle (the angle the optical axes of the right and left image sensing systems make with each other) are changed depending on the distance to an object (i.e., a far object or near object). This is done to capture the overlapping region between the right and left images since the region changes depending on the distance to the object (i.e., a far object or near object). For example, when the right and left image sensing systems are placed parallel to each other, the overlapping region becomes narrower as the object becomes closer. In order to assure this overlapping region upon image sensing, the optical axis directions of the right and left image sensing systems must be adjusted.

When the distance between the two, right and left image sensing systems is short, the right and left images have no disparity with respect to a far object, and sufficient stereoscopic sense cannot be obtained. Hence, in such case, the distance between the two, right and left image sensing systems must be increased. In this manner, upon image sensing using the multi-eye image sensing apparatus, to adjust the base length and convergence angle in correspondence with each object is an important technical requirement.

The image sensing optical systems of the aforementioned multi-eye image sensing apparatus will be explained below with reference to FIG. 27. FIG. 27 depicts the layout of the image sensing optical systems in the conventional multi-eye image sensing apparatus.

In the conventional multi-eye image sensing apparatus, as shown in FIG. 27, the optical axis spacing (base length) and the angle the optical axes make with each other (convergence angle) are changed by mechanically moving the right and left image sensing optical systems. The conventional multi-eye image sensing apparatus is capable of sensing a so-called panoramic image, which has a broader angle in the horizontal direction, using two or more image sensing systems. Upon sensing the panoramic image, the plurality of image sensing optical systems are placed to be capable of sensing different fields of view by nearly matching their viewpoints each other, and minimizing the overlapping region between images required for joining the images sensed by the image sensing optical systems in an image process. In this case, the optical axis spacing and the angle the optical axes make with each other in the image sensing optical systems are mechanically adjusted.

On the other hand, recently, even in a non-coaxial optical system, an optical system in which aberrations can be satisfactorily corrected using an asymmetric aspherical surface as a constituent surface can be built by introducing the concept "reference axis", as disclosed in Japanese Patent Laid-Open Nos. 9-5650, 8-292371, and 8-292372. Japanese Patent Laid-Open No. 9-5650 discloses the design method of such optical system, and Japanese Patent Laid-Open Nos. 8-292371, and 8-292372 disclose its design examples.

Such non-coaxial optical system is called an offaxial optical system, which is defined as an optical system in which, assuming a reference axis along a light ray passing through the image center and pupil center, a normal to the surface at the intersection of a constituent surface with the reference axis contains a curved surface (offaxial surface) which is not present on the reference axis, and the reference axis at that time has a bent shape.

In this offaxial optical system, in general, since its constituent surfaces are offaxial and no eclipse is produced on a reflecting surface, an optical system using the reflecting surface can be easily build. Also, the optical path can be laid out relatively freely, and a one-piece optical system can be easily formed by forming constituent surfaces by one-piece molding.

However, in the above-mentioned conventional multi-eye image sensing apparatus, since the convergence angle and base length of its image sensing optical systems are changed by moving and rotating these optical systems, the entire apparatus becomes bulky if the image sensing optical systems are comprised of coaxial optical systems.

Especially, upon sensing a panoramic image, the right and left viewpoints must be nearly matched (i.e., the base length as the spacing between the centers of the entrance pupils of the respective image sensing optical systems must be set to be nearly zero). However, since the entrance pupil position cannot be largely moved toward the object side, when the convergence angle becomes equal to or larger than a predetermined angle, lenses in the respective image sensing optical systems may interfere with each other. As a consequence, the base length cannot become smaller than a predetermined length. Or if the base length is set at an appropriate length, a large convergence angle cannot be set.

In case of the multi-eye image sensing apparatus, the right and left image sensing systems must have uniform magnification and imaging performance. However, in the conventional apparatus, since a plurality of lenses are built in lens barrels in the right and left image sensing systems, the optical characteristics of the right and left image sensing systems suffer variations. Hence, the magnifications and the like in the right and left image sensing systems must be adjusted.

Furthermore, upon switching to the panoramic image sensing mode by increasing the convergence angle of the image sensing optical systems, since "central viewpoints" ("central viewpoint" means a point on a line obtained by extending the reference axis of each image sensing optical system toward the object, and such point will be referred to as a "central viewpoint" hereinafter) of the right and left image sensing optical systems are different from ideal ones of a synthesized image, an image process for removing apparent trapezoidal distortion arising from the "central viewpoint" difference must be done upon joining the right and left images.

An example upon sensing a panoramic image will be described below with reference to FIGS. 28A to 28C. FIGS. 28A to 28C are views showing images sensed by panoramic image sensing of the conventional multi-eye image sensing apparatus, and an ideal synthesis result of those images.

Upon sensing a panoramic image using the two, right and left image sensing optical systems, since these systems have a convergence angle, as shown in FIG. 28A, they have different "central viewpoints" with respect to an object to be sensed, as shown in FIGS. 28B and 28C. More specifically, since the "central viewpoints" of the right and left image sensing optical systems are different from an ideal "central viewpoint" of a synthesized image shown in FIG. 28C, an image process for removing apparent trapezoidal distortion arising from the "central viewpoint" difference must be done upon joining the right and left images. However, when the trapezoidal distortion is removed by only the image process, the image quality deteriorates.

SUMMARY OF THE INVENTION

It is the first object of the present invention to provide a multi-eye image sensing apparatus, which can reduce the number of building components of image sensing optical systems, and can realize a compact arrangement.

It is the second object of the present invention to provide a multi-eye image sensing apparatus which can easily change the convergence angle without increasing the base length.

It is the third object of the present invention to provide a multi-eye image sensing apparatus which can easily change the base length.

It is the fourth object of the present invention to provide a multi-eye image sensing apparatus which can suppress variations of imaging performance.

It is the fifth object of the present invention to provide a multi-eye image sensing apparatus which can easily switch the image sensing mode between a three-dimensional image sensing mode and panoramic mode.

It is the sixth object of the present invention to provide a multi-eye image sensing apparatus which can obtain an image which suffers less apparent trapezoidal distortion arising from the difference between the right and left central viewpoints.

It is the seventh object of the present invention to provide a multi-eye image sensing apparatus which can selectively execute a three-dimensional image sensing mode and panoramic image sensing mode without making the apparatus bulky.

In order to solve the aforementioned problems and to achieve the above objects, according to the first invention, since at least one offaxial optical system block which includes an offaxial reflecting surface that is an asymmetric aspherical surface, and has a refractive power that can form a real image as a whole is provided to each of the image sensing systems, the number of building components of the respective image sensing systems can be reduced, and a compact arrangement can be realized.

Even when the image sensing systems are placed to have a small spacing between the image sensing elements, a large base length as the spacing between irises can be assured, and optical elements can be prevented from interfering with each other even upon setting a large convergence angle.

According to the second invention, since the offaxial optical system block includes an offaxial reflecting surface which is a vertically symmetric and horizontally asymmetric aspherical surface, and the offaxial optical system blocks are provided to the right and left image sensing systems upside down, the image sensing systems which have a smaller shape than the conventional image sensing systems in each of which lenses are built in a lens barrel, and have a small difference in optical characteristics such as imaging performance and the like between the right and left systems, can be realized.

According to the third invention, since the offaxial optical system block is prepared by molding, variations of imaging performance can be suppressed by setting constant forming conditions upon forming the blocks by one-piece molding of plastic, glass, or the like.

According to the fourth invention, since some or all components of the image sensing systems which include the offaxial optical system blocks are pivotal, and a three-dimensional image sensing mode in which the right and left image sensing systems have disparity, and a panoramic image sensing mode in which viewpoints of the right and left image sensing systems substantially match can be switched to one another by pivoting the some or all components, the three-dimensional image sensing mode and panoramic mode can be easily switched.

According to the fifth invention, since the right and left image sensing systems form images by producing trapezoidal distortions having horizontally reversed patterns, an image which suffers less apparent trapezoidal distortion due to the difference between the right and left central viewpoint can be obtained upon synthesizing a panoramic image. Hence, the image quality can be prevented from deteriorating upon removing that trapezoidal distortion by only the image process.

According to the sixth invention, since entrance and exit reference axes are located on different straight lines in the image sensing systems, the convergence angle and base length can be relatively freely set by exploiting high degree of freedom in layout of the entrance and exit reference axes.

According to the seventh invention, since the image sensing systems have an iris immediately before an object-side entrance surface, the base length as the spacing between irises can be shortened upon panoramic image sensing, and even in the layout of the image sensing systems with a large convergence angle, these image sensing systems including the iris can be prevented from interfering with each other.

According to the eighth invention, since the image sensing systems have an iris immediately before an object-side entrance surface of the offaxial optical system block, the offaxial optical system block and iris can be fixed by a single holding member, and a further size reduction of the apparatus can be attained.

According to the ninth embodiment, since each of the image sensing systems including the offaxial optical system blocks forms an image at least once in the middle of an optical path that extends to an imaging surface, the image sensing system can have a small shape.

According to the 10th invention, since some or all components of the image sensing systems which include the offaxial optical system blocks are pivotal, and a convergence angle the plurality of image sensing systems make is changed by pivoting the some or all components, the convergence angle can be easily changed without increasing the base length.

According to the 11th invention, since some or all components of the image sensing systems which include the offaxial optical system blocks are pivotal within a plane including exit reference axes of the offaxial optical system blocks, the convergence angle can be flexibly changed by adjusting the pivot amount in the plane including the exit reference axis.

According to the 12th invention, since some or all components of the image sensing systems which include the offaxial optical system blocks are pivotal, and a base length of the plurality of image sensing systems make is changed by pivoting the some or all components, the base length can be easily changed.

According to the 13th invention, since some or all components of the image sensing systems which include the offaxial optical system blocks are pivotal about exit reference axes of the offaxial optical system blocks, the base length can be flexibly changed by adjusting the pivot amount about the exit reference axis.

According to the 14th invention, since the plurality of image sensing systems are constructed to be able to switch between a three-dimensional image sensing mode for producing disparity between the right and left image sensing systems, and a panoramic image sensing mode for substantially matching viewpoints of the right and left image sensing systems with each other, by exchanging the offaxial optical system blocks, the three-dimensional image sensing mode and panoramic image sensing mode can be selectively executed without making the apparatus bulky.

According to the 15th invention, a plurality of reflecting surfaces that make surface reflection are formed on the offaxial optical system block, and an incoming light beam exits the offaxial optical system block after the light beam repeats reflection on the reflecting surfaces.

According to the 16th invention, since the plurality of image sensing systems have a three-dimensional image sensing optical block for producing disparity between the right and left image sensing systems, and a panoramic image sensing optical block for substantially matching viewpoints of the right and left image sensing systems with each other, the three-dimensional and panoramic image sensing optical blocks comprise offaxial optical system blocks each of which includes an offaxial reflecting surface that is an asymmetric aspherical surface as a building component, and has a refractive power that can form a real image, and the three-dimensional and panoramic image sensing modes can be switched to one another by switching between the three-dimensional and panoramic image sensing optical blocks, the three-dimensional image sensing mode and panoramic image sensing mode can be selectively executed without making the apparatus bulky.

According to the 17th invention, the three-dimensional and panoramic image sensing optical system blocks are placed in an identical plane.

According to the 18th invention, the three-dimensional and panoramic image sensing optical system blocks are stacked parallel to a plane including a reference axis.

According to the 19th invention, the offaxial reflecting surface of each of the offaxial optical system blocks is an aspherical surface which is vertically symmetric and horizontally asymmetric, and the offaxial optical system blocks are built in the right and left image sensing systems upside down.

According to the 20th invention, each of the offaxial optical system blocks is prepared by molding.

According to the 21st invention, a plurality of reflecting surfaces that make surface reflection are formed on the offaxial optical system block, and an incoming light beam exits the offaxial optical system block after the light beam repeats reflection on the reflecting surfaces.

According to the 22nd invention, since the plurality of image sensing systems form images by producing trapezoidal distortions having horizontally reversed patterns upon sensing an image in the panoramic image sensing mode, a further size reduction of the apparatus can be attained.

According to the 23rd invention, the plurality of image sensing systems are constructed to have entrance and exit reference axes located on different straight lines.

According to the 24th invention, since the plurality of the image sensing systems perform intermediate imaging at least once in the middle of an optical path that extends to an imaging surface, a further size reduction of the apparatus can be attained.

According to the 25th invention, since the plurality of image sensing systems perform intermediate imaging at least once in the middle of an optical path that extends to a final exit surface, a further size reduction of the apparatus can be attained.

According to the 26th invention, in a multi-eye image sensing apparatus having a plurality of image sensing systems, since each of the plurality of image sensing systems has at least one offaxial optical system block which includes an offaxial reflecting surface that is an asymmetric aspherical surface as a building component, and has a refractive power that can form a real image, each offaxial optical system block includes a three-dimensional image sensing optical path for producing disparity between the right and left image sensing systems, and a panoramic image sensing optical path for substantially matching viewpoints of the right and left image sensing systems with each other, and three-dimensional and panoramic image sensing modes can be switched to one another by switching between the three-dimensional and panoramic image sensing optical paths by rotating the offaxial reflecting surface in the offaxial optical system block, the three-dimensional image sensing mode and panoramic image sensing mode can be selectively executed without making the apparatus bulky.

According to the 27th invention, the offaxial reflecting surface of each of the offaxial optical system blocks is an aspherical surface which is vertically symmetric and horizontally asymmetric, and the offaxial optical system blocks are built in the right and left image sensing systems upside down.

According to the 28th invention, each of the offaxial optical system blocks is prepared by molding.

According to the 29th invention, a plurality of reflecting surfaces that make surface reflection are formed on the offaxial optical system block, and an incoming light beam exits the offaxial optical system block after the light beam repeats reflection on the reflecting surfaces.

According to the 30th invention, since the plurality of image sensing systems form images by producing trapezoidal distortions having horizontally reversed patterns upon sensing an image in the panoramic image sensing mode, a further size reduction of the apparatus can be attained.

According to the 31st invention, the plurality of image sensing systems are constructed to have entrance and exit reference axes located on different straight lines.

According to the 32nd invention, since the plurality of image sensing systems have an iris immediately before an object entrance surface, a further size reduction of the apparatus can be attained.

According to the 33rd invention, since the plurality of the image sensing systems perform intermediate imaging at least once in the middle of an optical path that extends to a final exit surface, a further size reduction of the apparatus can be attained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 13A to 13C depict an image sensed in a panoramic mode using right and left optical elements having trapezoidal distortion in imaging performance;

FIG. 23 is a block diagram showing the arrangement of a multi-eye image sensing apparatus according to the seventh embodiment of the present invention;

DETAILED DESCRIPTION OF THE PREFERRED EMBODIMENTS

The preferred embodiments of the present invention will be described hereinafter with reference to the accompanying drawings.

[First Embodiment]

Figure 1:
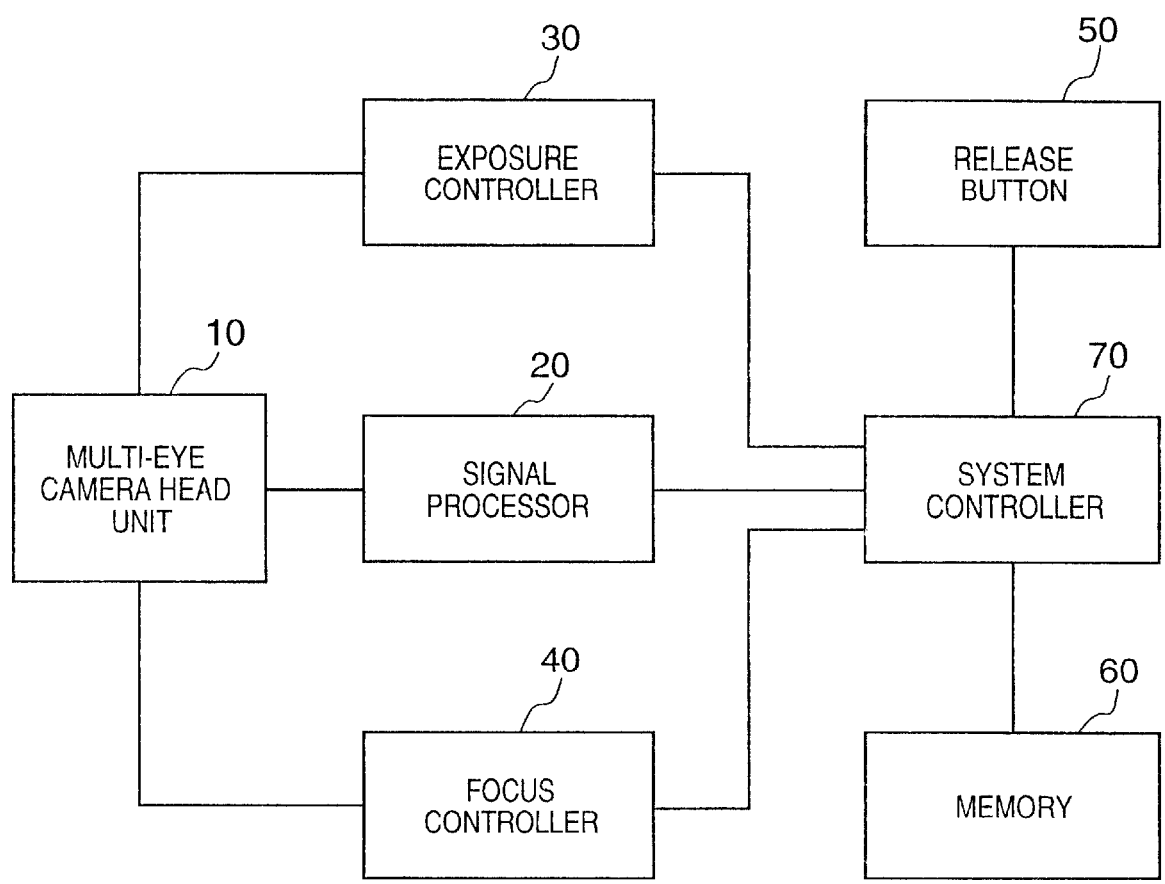
FIG. 1 is a block diagram showing the arrangement of a multi-eye image sensing apparatus according to the first embodiment of the present invention.

FIG. 1 is a block diagram showing the arrangement of a multi-eye image sensing apparatus of the first embodiment.

Referring to FIG. 1, reference numeral 10 denotes a multi-eye camera head unit, which senses images of an object, and outputs image signals. Reference numeral 20 denotes a signal processor for converting image signals obtained by the multi-eye camera head unit 10 into image data of, e.g., JPEG (Joint Photographer Expert Group) or the like. Reference numeral 30 denotes an exposure controller for controlling the exposure values of right and left image sensing systems of the multi-eye image camera head unit 10 in correspondence with the brightness of the object.

Reference numeral 40 denotes a focus controller for controlling focusing on the object. Reference numeral 50 denotes a release button. Reference numeral 60 denotes a memory for storing image data. Reference numeral 70 denotes a system controller for controlling the operation of the overall multi-eye image sensing apparatus.

Figure 2:
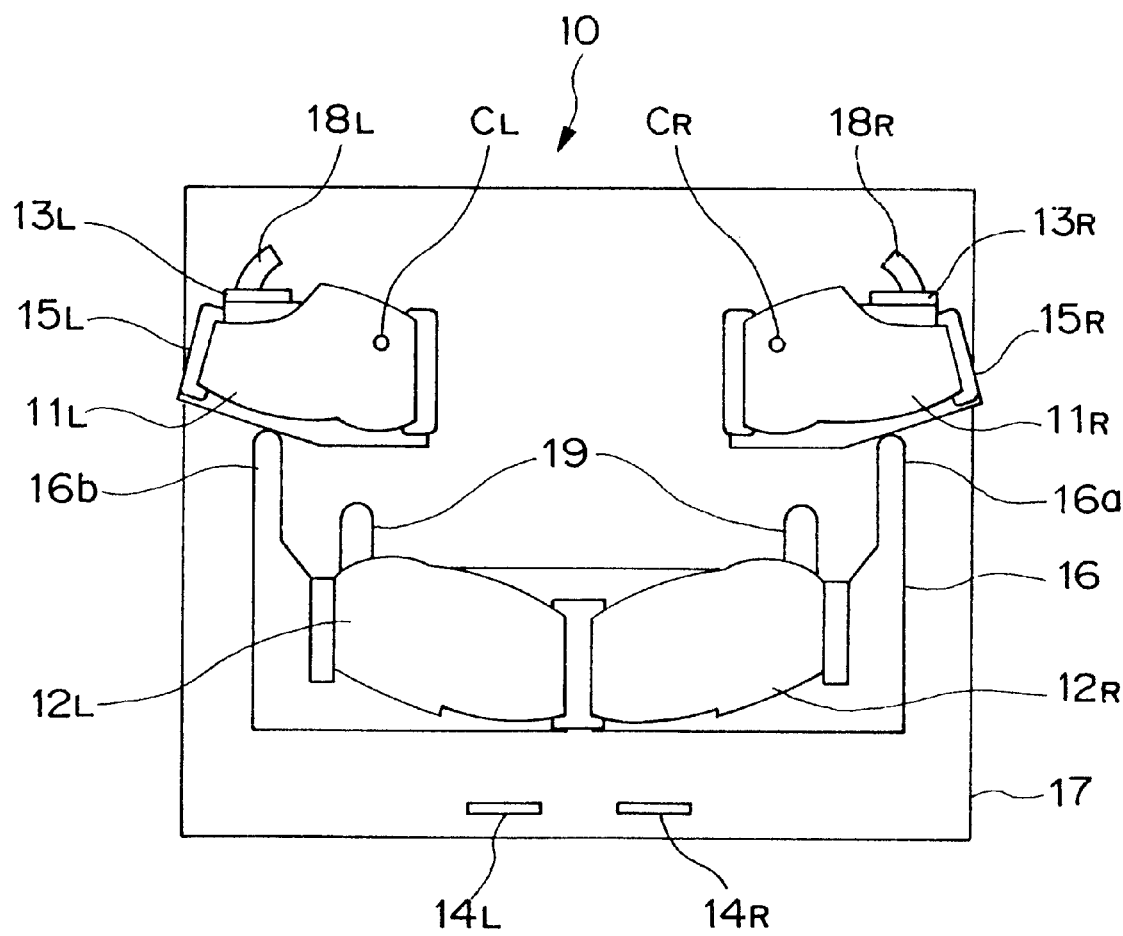
FIG. 2 is a view showing the arrangement of a camera head unit 10.

FIG. 2 shows the arrangement of the camera head unit 10.

Referring to FIG. 2, reference numerals 11R and 11L respectively denote optical elements on the object side, each of which is an offaxial optical system block formed of a transparent member such as glass or the like, and having a plurality of reflection and refracting surfaces.

Figure 3:
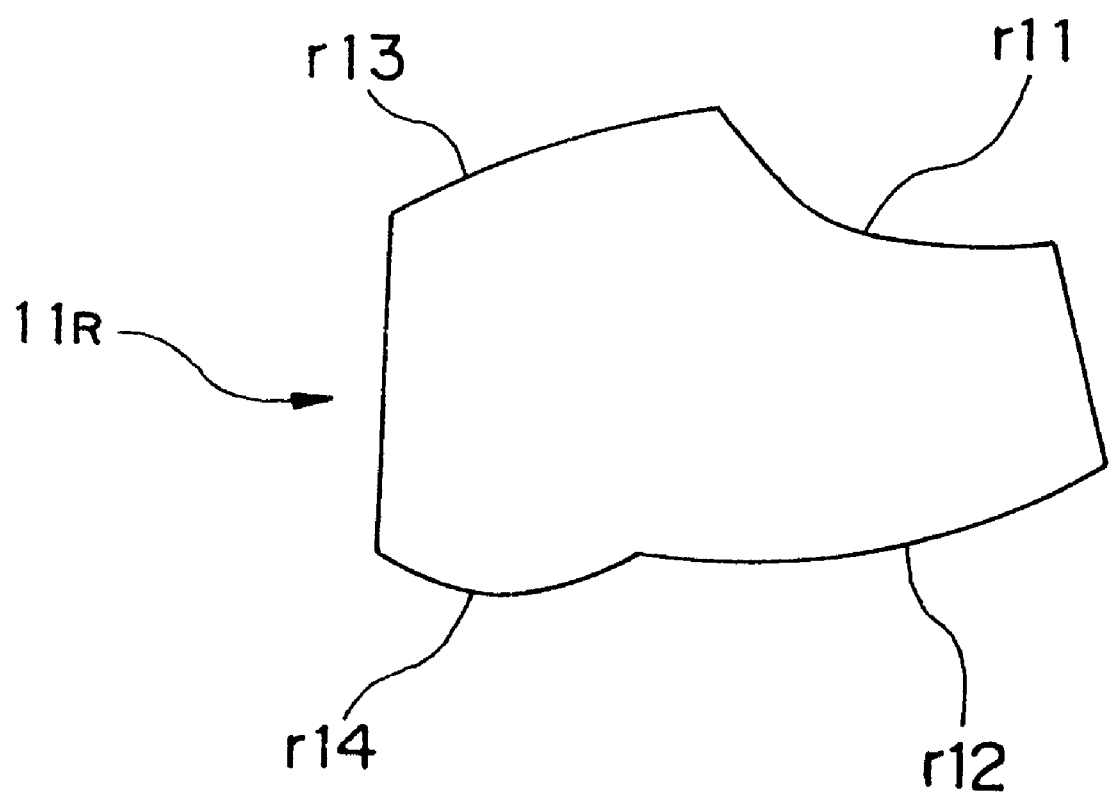
FIG. 3 is a view showing the shape of an optical element 11R on the object side.

FIG. 3 shows the shape of the optical element 11R on the object side.

Referring to FIG. 3, a concave refracting surface (entrance surface) r11 having a negative refractive power, reflecting surface r12, reflecting surface r13, and convex refracting surface (exit surface) r14 having a positive refractive power are formed on the surface of the optical element 11R on the object side in the order light rays coming from the object pass by.

The concave refracting surface r11 and convex refracting surface r14 have a spherical shape. The reflecting surfaces r12 and r13 have symmetry in a direction perpendicular to the plane of page of FIG. 3, but have no symmetry in that plane of page, i.e., have a rotation-asymmetric aspherical shape as a whole.

The other optical element 11L on the object side is symmetrical to the optical element 11R on the object side, and similarly has a concave refracting surface (entrance surface), two reflecting surfaces, and convex refracting surface (exit surface). More specifically, the optical element 11L has symmetry in the direction perpendicular to the plane of page of FIG. 2, and is obtained by inserting the same element as the optical element 11R upside down in the direction perpendicular to the plane of page.

Each of the optical elements 11R and 11L is formed into a one-piece shape of a transparent member by molding of plastic, glass, or the like. When molding is done under constant forming conditions, the optical characteristics vary less than a conventional system in which lenses are assembled in a lens barrel. Hence, multi-eye, right and left image sensing systems having a small difference in imaging performance therebetween can be obtained.

Figure 4:
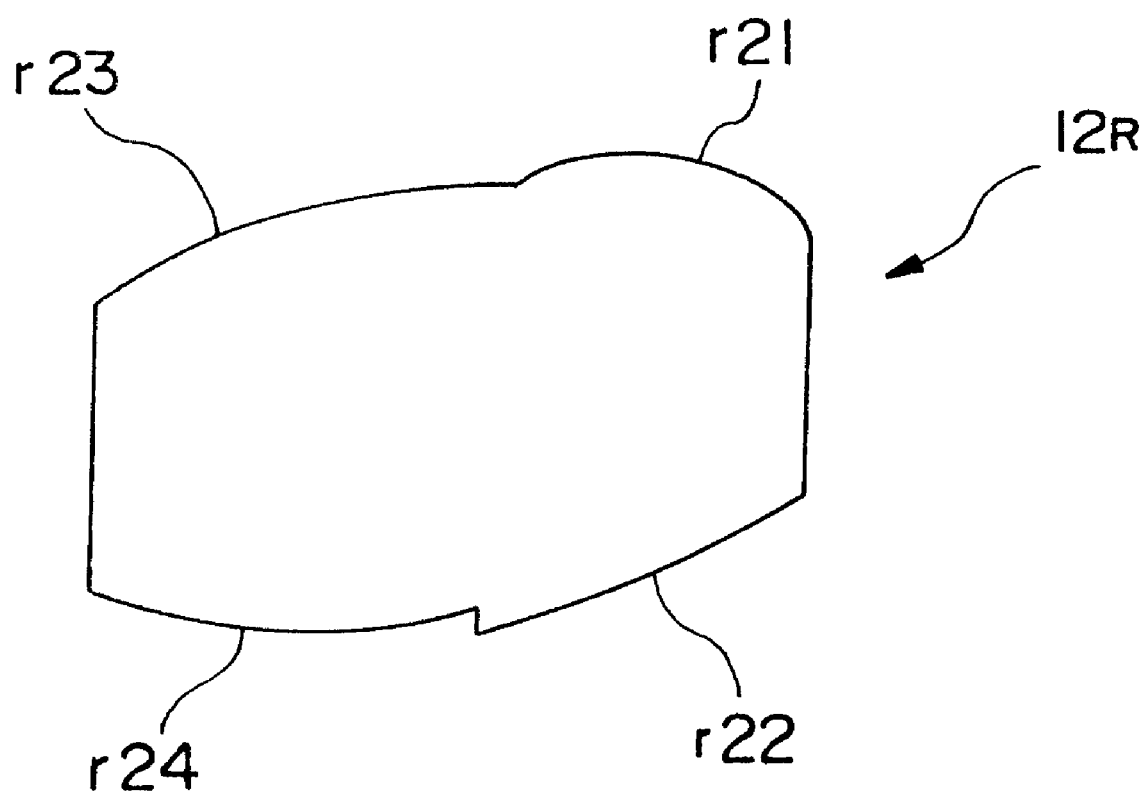
FIG. 4 is a view showing the shape of an optical element 12R on the image side.

FIG. 4 shows a shape of an optical element 12R on the image side. The optical element 12R is a transparent member such as glass or the like, having a plurality of reflection and refracting surfaces.

A convex refracting surface (entrance surface) r21 having a positive refractive power, reflecting surface r22, reflecting surface r23, and convex refracting surface (exit surface) r24 having a positive refractive power are formed on the surface of the optical element 12R on the image side in the order light rays coming from the object pass by.

The convex refracting surfaces r21 and r24 have a spherical shape. The reflecting surfaces r22 and r23 have symmetry in a direction perpendicular to the plane of page of FIG. 4, but have no symmetry in that plane of page, i.e., have a rotation-asymmetric aspherical shape as a whole.

The other optical element 12L on the image side has a shape symmetrical to that of the optical element 12R on the image side, and similarly has a convex refracting surface (entrance surface), two reflecting surfaces, and convex refracting surface (exit surface). More specifically, the optical element 12L has symmetry in the direction perpendicular to the plane of page of FIG. 2, and is obtained by inserting the same element as the optical element 12R upside down in the direction perpendicular to the plane of page.

Each of the optical elements 12R and 12L is formed into a one-piece shape of a transparent member by molding of plastic, glass, or the like. As in the optical elements 11R and 11L, molding can build multi-eye, right and left image sensing systems having a small difference in imaging performance therebetween.

Referring to FIG. 2, reference numerals 13R and 13L denote irises that limit the amounts of light beams that enter the optical elements 11R and 11L, respectively. These irises 13R and 13L are placed on the object side where the optical elements 11R and 11L are located. Reference numerals 14R and 14L denote image sensing elements such as CCDs, which are respectively placed at positions where light beams that leave the optical elements 12R and 12L on the image side form images. The optical elements 11L and 12L, iris 13L, and image sensing element 14L construct a left image sensing system, and the optical elements 11R and 12R, iris 13R, and image sensing element 14R construct a right image sensing system. The two image sensing systems are symmetrically placed.

Reference numerals 15R and 15L denote holding members for respectively fixing the optical elements 11R and 11L, and irises 13R and 13L; and 16, a holding member for fixing the optical elements 12R and 12L. Reference numeral 17 denotes a base for holding the holding members 15R, 15L, and 16, and image sensing elements 14R and 14L.

Reference numerals 18R and 18L denote cam grooves formed in the base 17. The holding members 15R and 15L that hold the optical elements 11R and 11L are pivotal about centers CR and CL along the cam grooves 18R and 18L. Note that the centers CR and CL are located at the centers of curvature of the exit surfaces r14 of the optical elements 11R and 11L, and the holding members 15R and 15L that hold the optical elements 11R and 11L are attached to the base 17 to be pivotal about these centers CR and CL as pivot axes.

Reference numeral 19 denote a guide groove. The holding member 16 is attached to the base 17 to be movable along the guide groove 19.

Figure 5:
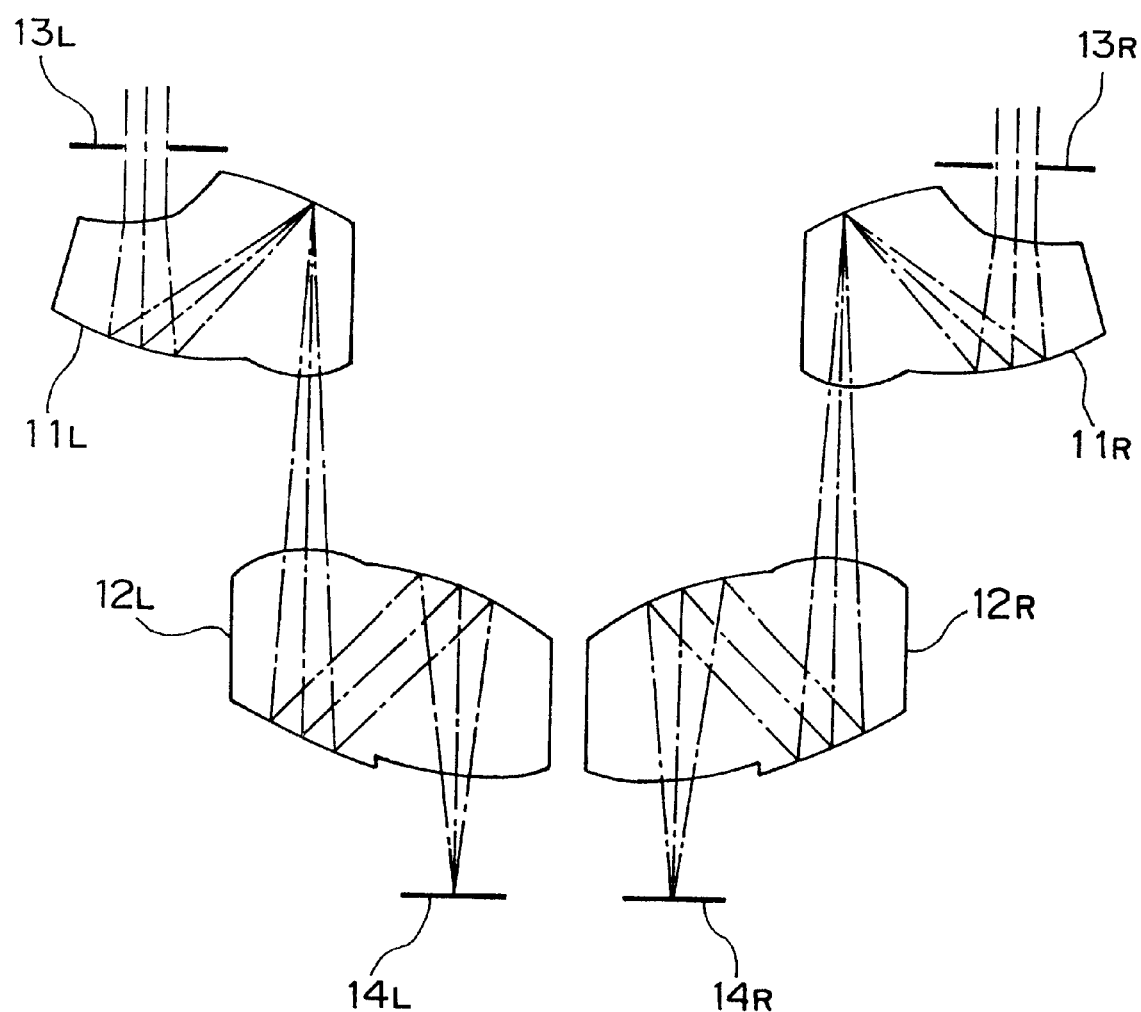
FIG. 5 is a view showing the layout and optical paths of right and left image sensing optical systems when an object is located at a far distance position.
Figure 6:
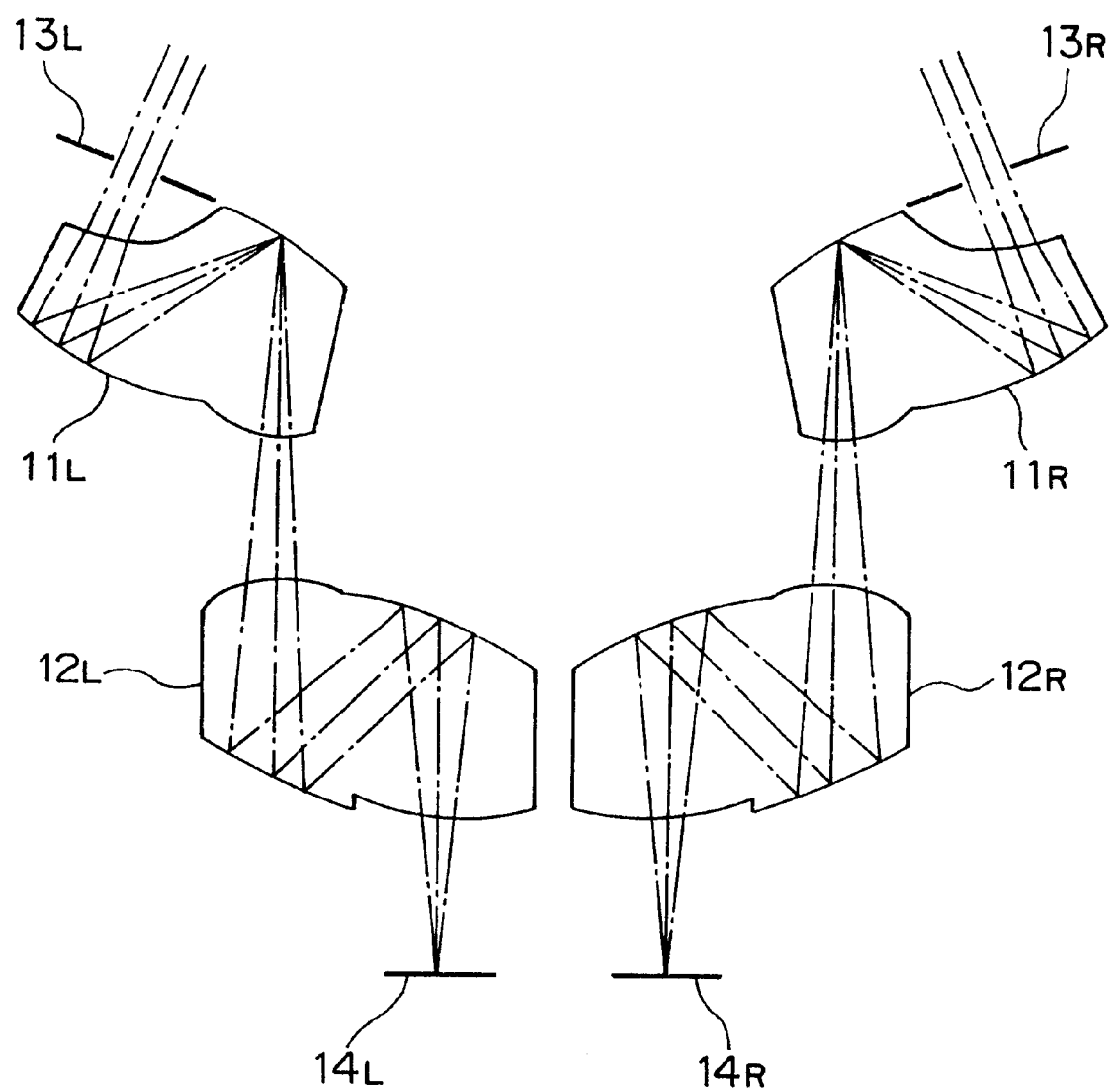
FIG. 6 is a view showing the layout and optical paths of the right and left image sensing optical systems when an object is located at a near distance position.

FIG. 5 shows the layout and optical paths of the right and left image sensing systems when the object is located at a far distance position. FIG. 6 shows the layout and optical paths of the right and left image sensing systems when the object is located at a near distance position. The convergence angle between the right and left image sensing system varies depending on the distance to the object.

In this embodiment, a light ray (reference axis light ray) that passes through the central point of the light ray effective diameter of the iris and reaches the center of a final imaging surface is set to have a route which is refracted and reflected by the refracting and reflecting surfaces, and is indicated by the one-dot chain lines in FIGS. 5 and 6.

The imaging operation when the object is located at a far distance position (see FIG. 5) will be explained first using the right image sensing system. After the amount of a light beam that comes from the object and enters the right image sensing system is limited by the iris 13R, the light beam becomes incident on the entrance surface r11 of the optical element 11R, and is reflected by the reflecting surface r12. After that, the light beam is temporarily imaged in the vicinity of the reflecting surface r13, and exits the optical element 11R from the exit surface r14. The reason why the light beam is temporarily imaged in the vicinity of the reflecting surface r13 is to prevent the size of the image sensing system from becoming larger by converging the incoming light beam from the entrance surface r11 by the reflecting surface r13. Thus, the image sensing system can have a compact size.

The light beam that has exited the exit surface r14 enters the entrance surface r21 of the optical element 12R, and is reflected by the reflecting surfaces r22 and r23. After that, the light beam leaves the optical element 12R from the exit surface r24, and forms an image on the image sensing element 14R placed on the imaging surface. In this case (see FIG. 5), the optical elements 11R and 12R are placed so that their reference axes of incoming light (entrance reference axes) and the reference axes of outgoing light (exit reference axes) are parallel to each other.

Since the left image sensing system is symmetrical to the right image sensing system, a light beam that enters the left image sensing system forms an image on the image sensing element 14L via a similar optical path.

The imaging operation when the object is located at a near distance position (see FIG. 6) will be explained below. In this embodiment, the optical elements 12R and 12L have an effect of focus lens, and have moved from the positions in FIG. 5 to the object side by the same amount along the entrance and exit reference axes. The movement of the holding member 16 that holds the optical elements 12R and 12L is restrained by the guide groove 19. Note that the optical elements 12R and 12L are placed on the holding member 16 so that their entrance and exit reference axes become parallel to each other.

On the other hand, the optical elements 11R and 11L have been pivoted about the centers CR and CL so that the entrance reference axes of the optical elements 11R and 11L converge inwardly. These pivot amounts are restrained by the cam grooves 18R and 18L that respectively guide the holding members 15R and 15L for holding the optical elements 11R and 11L.

The optical elements 12R and 12L on the image side and the optical elements 11R and 11L on the object side move in cooperation with the holding member 16 that moves toward the object side (see FIG. 2), and the optical elements 11R and 11L pivot within the planes including the exit reference axes when projections 16b and 16a respectively push the holding members 15R and 15L.

The holding members 15R and 15L are always biased to abut against the projections 16b and 16a of the holding members 16 by springs (not shown). Light beams that enter the right and left image sensing systems in this state form images on the image sensing elements 14R and 14L via the same optical paths as those shown in FIG. 5.

In this manner, a compact arrangement can be provided. In this arrangement, even when the image sensing systems are placed to shorten the spacing between the image sensing elements 14R and 14L, since the optical elements 11R, 11L, 12R, and 12L use offaxial optical system blocks, the base length as the spacing between the irises 13R and 13L can be increased. Also, even when the image sensing systems make a given convergence angle with each other, as shown in FIG. 6, the optical elements can be prevented from interfering with each other.

The operation of the overall multi-eye image sensing apparatus will be explained below using FIG. 1. Assume that all the operations are controlled by the system controller 70 unless otherwise specified.

When the user has pressed the release button 50 to issue a release signal, focus control is executed. In the focus control, image signals obtained by the image sensing elements 14R and 14L of the right and left image sensing systems are converted into image data by the signal processor 20, and a phase difference between the central portions of the right and left image data is detected.

The focus controller 40 estimates object distance on the basis of the detected phase difference, and moves the holding member 16 that holds the optical elements 12R and 12L with the effect of focus lens in the right and left image sensing optical systems along the guide groove 19 to a position in correspondence with the object distance, thus adjusting the focus of the right and left image sensing systems. At this time, the holding members 15R and 15L that respectively hold the optical elements 11R and 11L on the object side pivot in cooperation with the movement of the holding member 16, thus changing the convergence angle in accordance with the object distance.

After that, exposure control is done. Image signals obtained by the image sensing elements 14R and 14L in the right and left image sensing systems are converted into image data by the signal processor 20. The exposure controller 30 measures the brightness values of the object on the basis of the right and left image data, and determines the aperture values and shutter speeds based on that measurement values in the right and left image sensing systems, and changes the aperture values of the irises 13R and 13L. After that, the exposure controller 30 starts exposure of the image sensing elements 14R and 14L at the determined shutter speeds.

Image signals obtained by the image sensing elements 14R and 14L in the right and left image sensing systems are converted into image data by the signal processor 20, and these converted image data are stored in the memory 60.

As described above, the first embodiment can provide a multi-eye image sensing apparatus which has the multi-eye camera head unit 10 capable of adjusting the convergence angle of the camera in correspondence with object distance. Since the image sensing systems of this apparatus are constructed by a plurality of prisms as offaxial optical system blocks having offaxial reflecting surfaces that are asymmetric spherical surfaces, and a positive refractive power, the convergence angle can be adjusted by pivoting some of these prisms in the planes including the exit reference axes.

Hence, the image sensing systems can be rendered compact, and the entire multi-eye image sensing apparatus that can adjust the convergence angle can also be rendered compact using such image sensing systems.

In this embodiment, a prism which has offaxial reflecting surfaces that are asymmetric aspherical surfaces, and a plurality of refractive powers is used as each block of the optical elements 11R, 11L, 12R, and 12L. Alternatively, as an offaxial optical system block having offaxial reflecting surfaces, a hollow block, all the surfaces of which are reflecting surfaces, may be used, as disclosed in Japanese Patent Laid-Open Nos. 8-292371 and 8-292372.

In this embodiment, the right and left image sensing systems are constructed by four prisms, i.e., offaxial optical system blocks. Alternatively, a one-piece prism which integrates both the optical elements 12R and 12L may be used to build the right and left image sensing systems.

[Second Embodiment]

Figure 7:
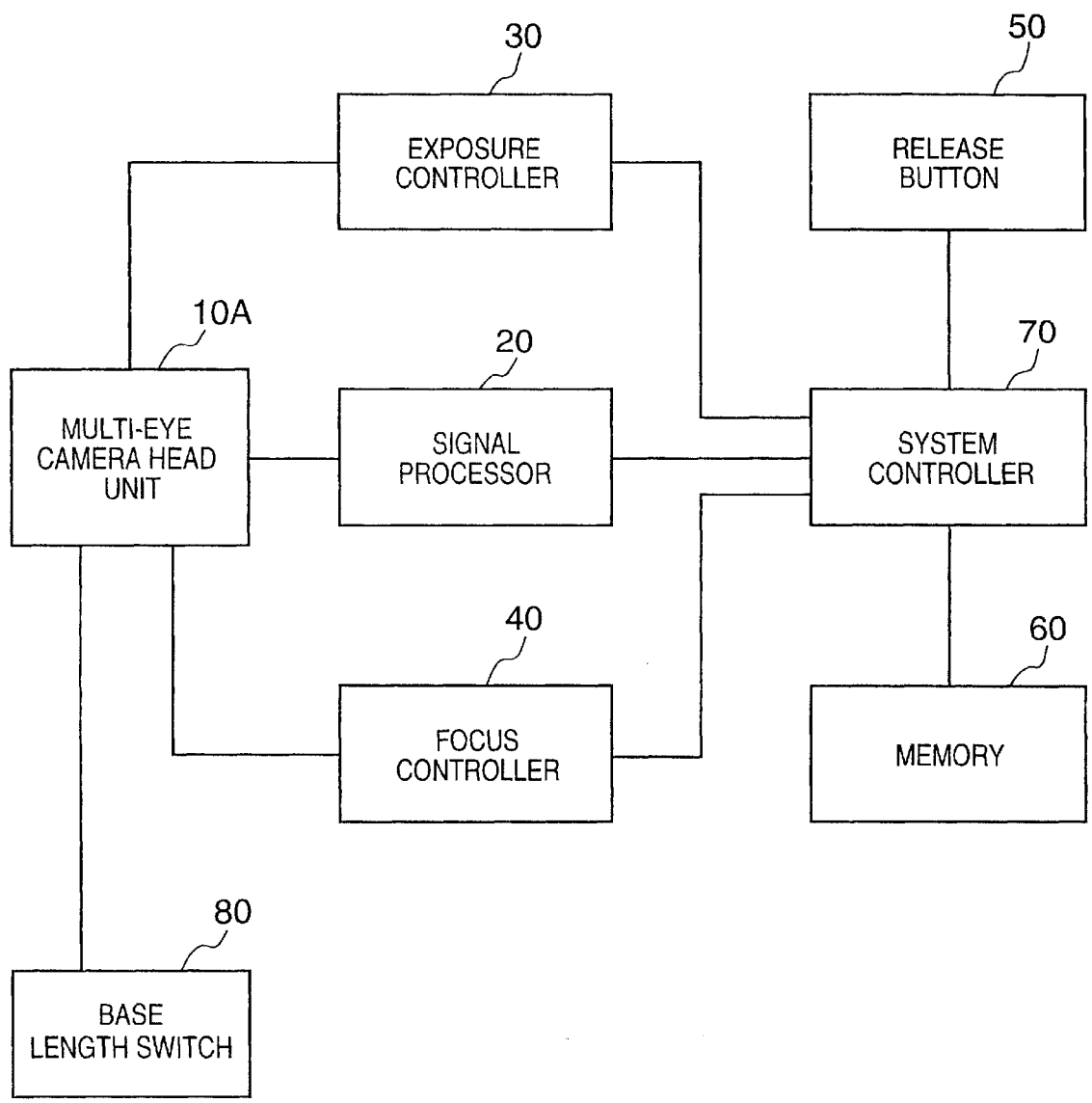
FIG. 7 is a block diagram showing the arrangement of a multi-eye image sensing apparatus according to the second embodiment of the present invention.

FIG. 7 is a block diagram showing the arrangement of a multi-eye image sensing apparatus of the second embodiment.

Referring to FIG. 7, reference numeral 10A denotes a multi-eye camera head unit which senses images of an object, and outputs image signals.

Reference numeral 20 denotes a signal processor for converting image signals obtained by the multi-eye camera head unit 10A into image data of, e.g., JPEG or the like. Reference numeral 30 denotes an exposure controller for controlling the exposure values of right and left image sensing systems of the multi-eye image camera head unit 10A in correspondence with the brightness of the object. Reference numeral 40 denotes a focus controller for controlling focusing on the object.

Reference numeral 50 denotes a release button. Reference numeral 60 denotes a memory for storing image data. Reference numeral 70 denotes a system controller for controlling the operation of the overall multi-eye image sensing apparatus. Reference numeral 80 denotes a base length switch for switching the base length of the multi-eye camera head unit 10A.

In the second embodiment, the base length switch 80 is added to the multi-eye image sensing apparatus in the first embodiment described above, and optical elements 11R and 11L are pivotal about their exit reference axes. In the multi-eye camera head unit 10A the convergence angle is fixed. Since other arrangements and operations are the same as those in the first embodiment, the same reference numerals in the second embodiment denote the same parts as in the first embodiment, and a detailed description thereof will be omitted. Hence, the base length switch 80 whose arrangement and operation are different from those in the first embodiment will be explained below.

Figure 8:
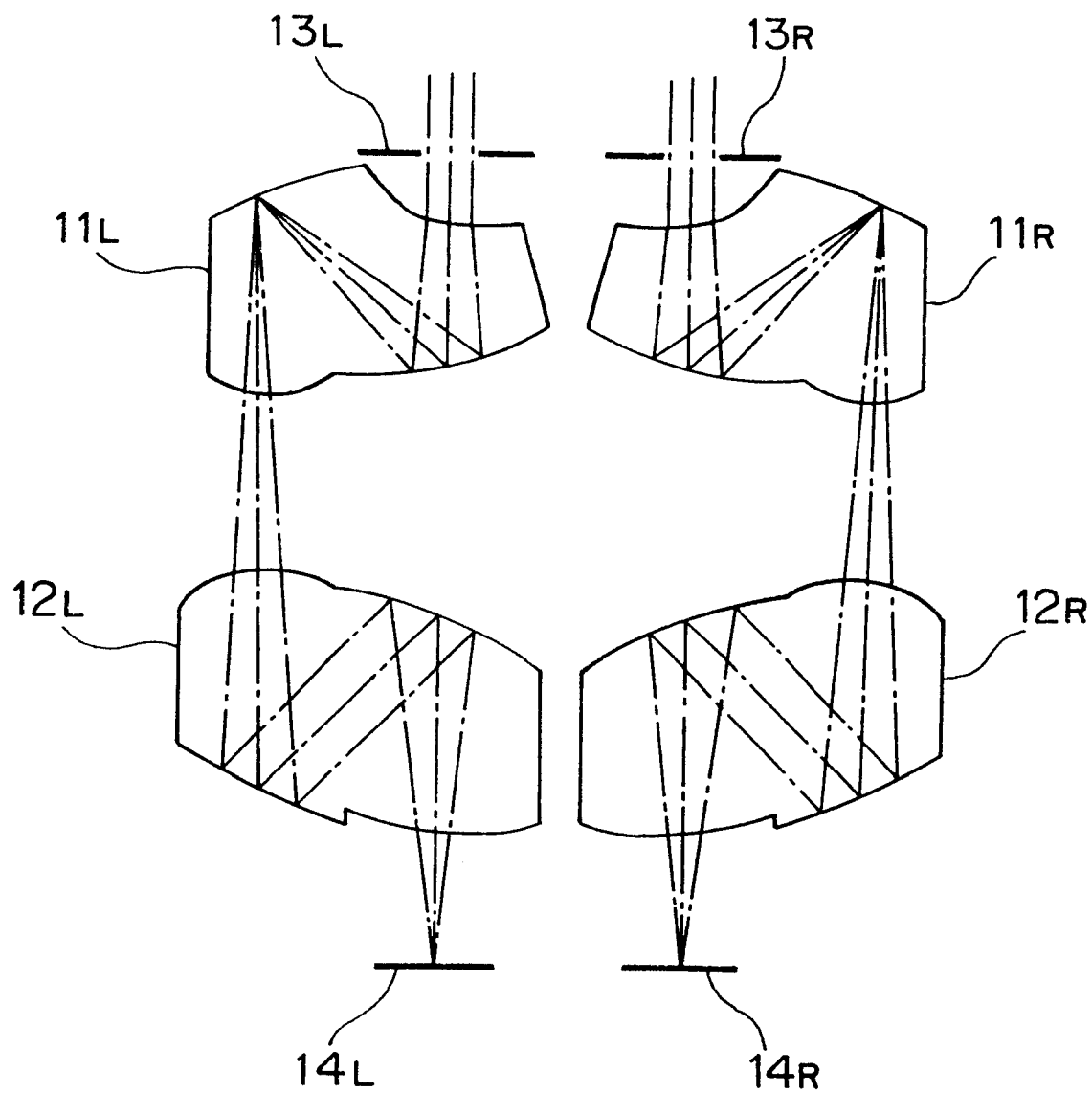
FIG. 8 is a view showing the optical layout with a short base length.

In the second embodiment, the base length switch 80 can pivot the optical elements 11R and 11L on the object side 180° in the multi-eye camera head unit 10A about their exit reference axes. With this pivotal movement, two, i.e., small and large base lengths can be switched. FIG. 5 mentioned above shows the optical layout with the large base length. On the other hand, FIG. 8 shows the optical layout with a small base length. In this manner, the multi-eye camera head unit 10A can switch the two, i.e., large and small base lengths.

In the second embodiment, the base length is switched to one of the large and small lengths by pivoting the optical elements 11R and 11L on the object side of the multi-eye camera head unit 10A 180° about their exit reference axes. Alternatively, by pivoting the optical elements 11R and 11L by an arbitrary identical amount, the multi-eye camera head unit 10A may be set to have an intermediate base length between the large and small base lengths.

As described above, the second embodiment can provide a multi-eye image sensing apparatus having a multi-eye camera head unit capable of switching of the base length in correspondence with each object.

Since the image sensing systems including offaxial optical system blocks are constructed by a plurality of prisms having offaxial reflecting surfaces that are asymmetric aspherical surfaces and plurality of refractive powers, and the base length is switched by pivoting some of these prisms, the image sensing systems can be rendered compact. Also, the entire multi-eye image sensing apparatus with these image sensing systems can be rendered compact.

In the second embodiment, a prism which has offaxial reflecting surfaces that are asymmetric aspherical surfaces, and a plurality of refractive powers is used as each block of the optical elements 11R, 11L, 12R, and 12L. Alternatively, as an offaxial optical system block having offaxial reflecting surfaces, a hollow block, all the surfaces of which are reflecting surfaces, may be used, as disclosed in Japanese Patent Laid-Open Nos. 8-292371 and 8-292372.

The first and second embodiments provide multi-eye image sensing apparatuses which can respectively change the convergence angle and base length. However, these functions may be combined to construct a multi-eye image sensing apparatus which can change both the convergence angle and base length.

The image sensing systems that use offaxial optical system blocks as the optical elements 11R, 11L, 12R, and 12L have been exemplified. Since high degree of freedom in layout of the entrance and exit reference axes is realized when offaxial optical system blocks are included, some of the optical elements 11R, 11L, 12R, and 12L may be replaced by conventional coaxial optical system blocks.

In this manner, since each of the right and left image sensing systems includes at least one prism as an offaxial optical system block, which includes an offaxial reflecting surface that is an asymmetric aspherical surface as a building component, and has a refractive power that can form a real image as a whole, a compact multi-eye image sensing apparatus which can relatively freely set the convergence angle and base length by exploiting a high degree of freedom in layout of the entrance and exit reference axes of the offaxial optical system block can be provided.

In the first and second embodiments, the number of multi-eyes is two, i.e., right and left eyes, for the sake of simplicity. However, images used in a three-dimensional display using a lenticular lens requires pairs of images having more viewpoints. In this case, a multi-eye image sensing apparatus having three or more image sensing systems is required. The present invention can be similarly applied to such apparatus like in the binocular apparatus.

[Third Embodiment]

In a multi-eye image sensing apparatus in the third embodiment, each of right and left image sensing systems is constructed by a single offaxial optical element (offaxial optical system block). Each of offaxial optical elements 21R and 21L serving as imaging optical elements has an entrance refracting surface, four reflecting surfaces which are asymmetric aspherical surfaces, and exit refracting surface. These elements 21R and 21L image light beams that have passed through irises 13R and 13L on image sensing elements 14R and 14L such as CCDs or the like.

Figure 9:
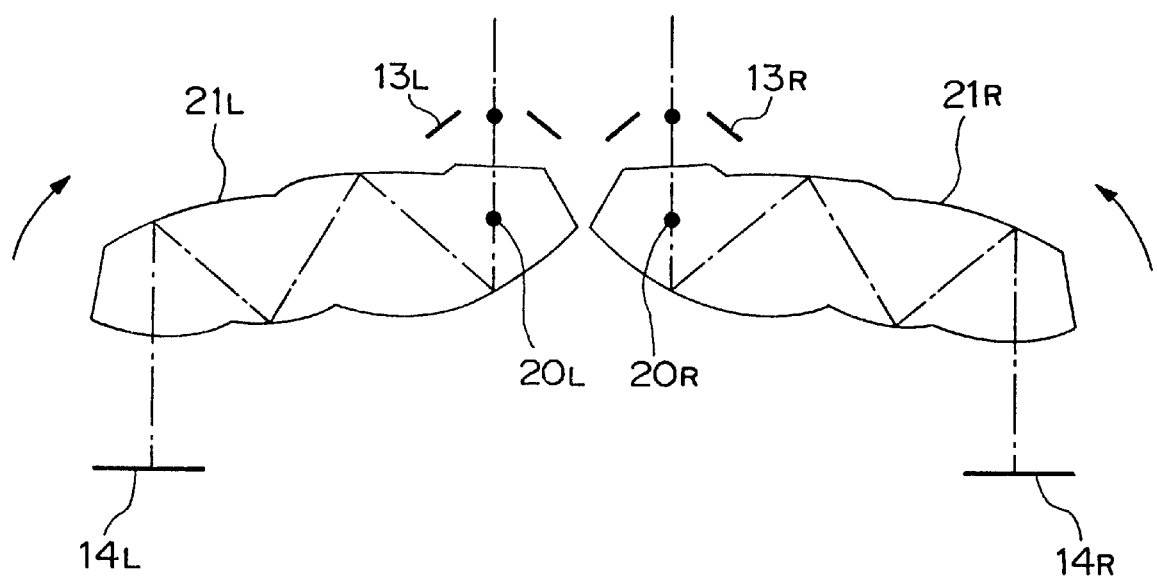
FIG. 9 is a view showing the layout of offaxial optical elements 21R and 21L when they are used in a three-dimensional image sensing mode in which right and left image sensing optical systems have disparity, according to the third embodiment of the present invention.

The offaxial optical elements 21R and 21L serving as imaging optical elements have no symmetry in the plane of page in FIG. 9, i.e., have a rotation asymmetric shape as a whole, as in the first and second embodiments.

The optical element 21L is symmetrical to the optical element 21R, and is obtained by inserting the same element as the optical element 21R upside down in a direction perpendicular to the plane of page as in the first and second embodiments.

Each of the optical elements 21R and 21L is formed into a one-piece shape of a transparent member by molding of plastic, glass, or the like. As in the optical elements 11R and 11L in the first and second embodiments, molding can build right and left image sensing systems having a small difference in imaging performance therebetween. Also, the optical elements 21R and 21L are pivotal about centers 20R and 20L.

Figure 10:
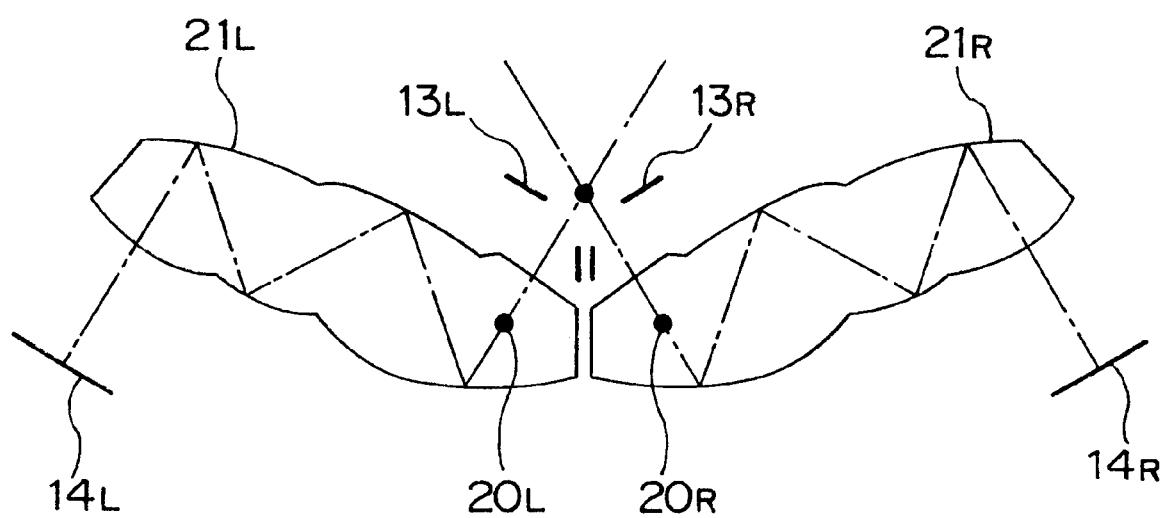
FIG. 10 is a view showing the layout of the offaxial optical elements 21R and 21L when they are used in a panoramic mode in which the viewpoints of the right and left image sensing optical systems nearly agree with each other, according to the third embodiment of the present invention.

FIG. 9 shows the layout of the offaxial optical elements 21R and 21L used in a three-dimensional image sensing mode in which the right and left image sensing systems have disparity. FIG. 10 shows the layout of the offaxial optical elements 21R and 21L used in a panoramic mode in which the viewpoints of the right and left image sensing systems nearly match. FIGS. 9 and 10 depict only reference axis light rays as optical paths of light rays that pass through the image centers and iris centers by one-dashed chain lines, for the sake of simplicity.

In general, when an offaxial optical system is of front iris type, i.e., an iris is set at a position closest to the object, the image sensing system can be easily rendered compact. Such front iris type image sensing system is suitable for the panoramic mode in which the right and left entrance pupil positions match. Hence, using the front iris type offaxial optical system block, a compact multi-eye image sensing apparatus capable of panoramic mode image sensing, which is hardly attained by a coaxial optical system, can be realized.

The two image sensing modes are switched by pivoting the offaxial optical system blocks (offaxial optical elements)

about the centers 20R and 20L without changing the relative positional relationship among the irises, offaxial optical system blocks, and image sensing elements. Upon switching the two image sensing modes, a multi-eye image sensing apparatus with higher value added can be provided.

In the third embodiment, the optical elements 21R and 21L are prisms each having offaxial reflecting surfaces that are asymmetric aspherical surfaces, and a plurality of refractive powers. Also, as an offaxial optical system block having offaxial reflecting surfaces, a hollow block, all the surfaces of which are reflecting surfaces, may be used, as disclosed in Japanese Patent Laid-Open Nos. 8-292371 and 8-292372.

[Fourth Embodiment]

Figure 11:
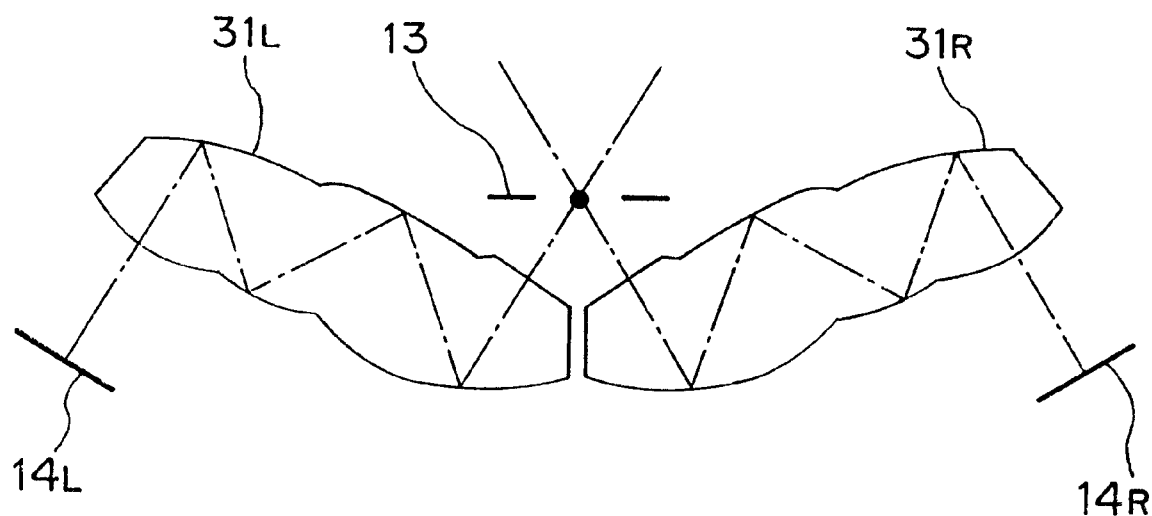
FIG. 11 is a view showing the layout of image sensing systems including offaxial optical elements according to the fourth embodiment of the present invention.

FIG. 11 shows the layout of image sensing systems including offaxial optical elements according to the fourth embodiment. These image sensing systems are dedicated to a panoramic mode, and have nearly the same arrangement as that in FIG. 10.

In the fourth embodiment, each of the right and left image sensing systems is comprised of a single offaxial optical element (offaxial optical system block). Each of offaxial optical elements 31R and 31L serving as imaging optical elements has an entrance refracting surface, four reflecting surfaces which are asymmetric aspherical surfaces, and exit refracting surface. These elements 31R and 31L image light beams that have passed through a common iris 13 on image sensing elements 14R and 14L such as CCDs or the like. Note that FIG. 11 depicts only reference axis light rays as optical paths of light rays that pass through the image centers and iris centers by one-dashed chain lines, for the sake of simplicity.

The offaxial optical elements 31R and 31L serving as imaging optical elements have no symmetry in the plane of page in FIG. 10, i.e., have a rotation asymmetric shape as a whole, as in the first and second embodiments. The optical element 31L is symmetrical to the optical element 31R, and is obtained by inserting the same element as the optical element 31R upside down in the direction perpendicular to the plane of page as in the third embodiment.

Each of the optical elements 31R and 31L is formed into a one-piece shape of a transparent member by molding of plastic, glass, or the like. As in the optical elements 11R and 11L in the first and second embodiments, molding can build right and left image sensing systems having a small difference in imaging performance therebetween.

As described above, in general, when an offaxial optical system is of front iris type, i.e., an iris is set at a position closest to the object, the image sensing system can be easily rendered compact. Such front iris type image sensing system is suitable for the panoramic mode in which the right and left entrance pupil positions are matched with each other. Hence, using the front iris type offaxial optical system block, a compact multi-eye image sensing apparatus capable of panoramic mode image sensing, which is hardly attained by a coaxial optical system, can be realized.

The characteristic feature of the multi-eye image sensing apparatus of the fourth embodiment, which is different from the third embodiment, is to introduce asymmetric trapezoidal distortion in the imaging characteristics so that the user can observe an image in the panoramic mode more naturally.

In general, the offaxial optical systems use asymmetric aspherical surfaces as reflecting surfaces. Hence, asymmetric aberrations, which cannot be produced in rotation-symmetric coaxial optical systems unless they are decentered, can be easily produced. In that sense, the offaxial optical systems are suitable for multi-eye image sensing systems having the panoramic mode.

Figure 12A:
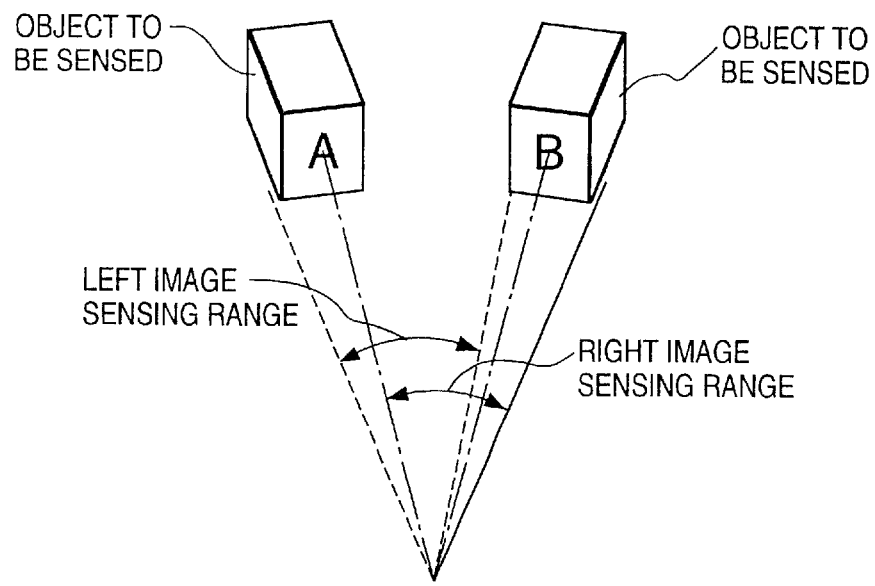
FIGS. 12A to 12C depict an image obtained by sensing an object located in front of right and left image sensing systems using optical elements having trapezoidal distortion in imaging performance.
Figure 12B:
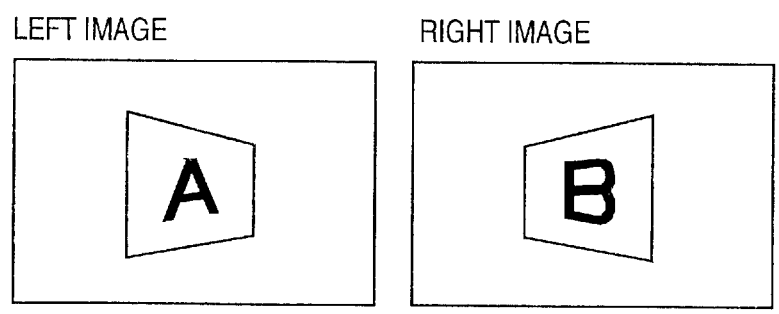
Figure 12C:
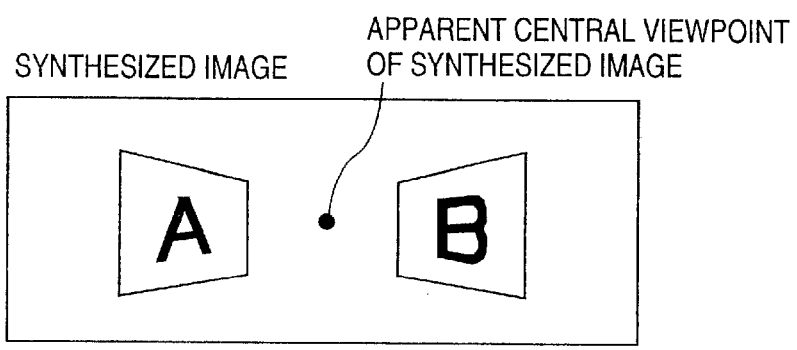

FIGS. 12A to 12C depict images obtained by sensing an object located in front of the right and left image sensing systems using optical elements having trapezoidal distortion in their imaging performance. If the imaging performance of each optical element does not have any trapezoidal distortion, front square surfaces "B" and "A" of cubes located in front of the right and left image sensing systems are sensed to have a square shape. By contrast, when trapezoidal distortion is given to the right and left imaging characteristics so that a portion to be joined (central portion) of an image becomes shorter than the outer side, the front square surfaces "B" and "A" of the cubes are recorded as images with deformed shapes, as depicted by two images in FIG. 12B. When the two images recorded with the deformed shapes are synthesized, a natural synthesized image is obtained as an image which has an apparent central viewpoint at the center, as shown in FIG. 12C.

In this fashion, providing trapezoidal distortion to the imaging performance of the right and left optical elements has an effect of apparently moving the central viewpoint.

Figure 28A:
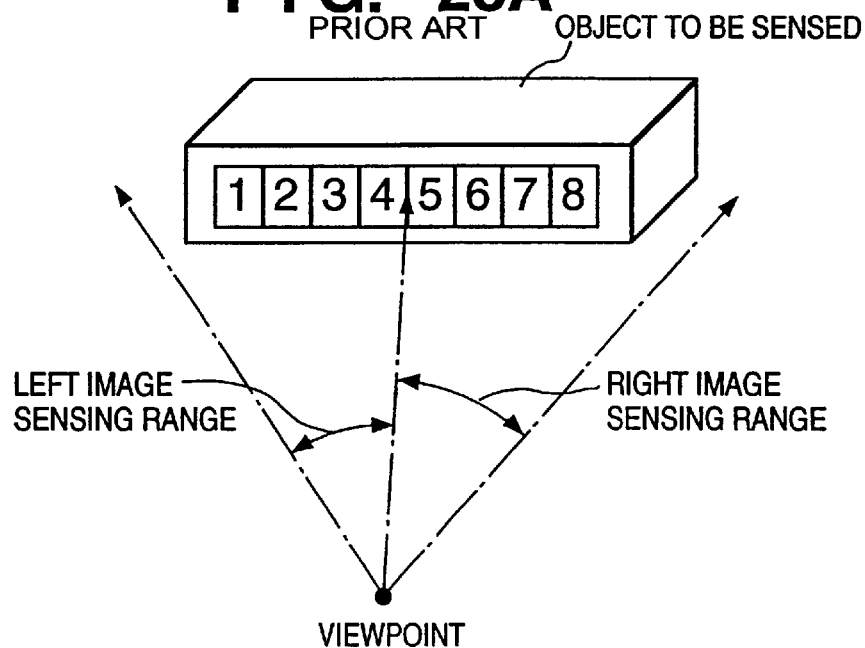
FIGS. 28A to 28C show images sensed in the panoramic image sensing mode by the conventional multi-eye image sensing apparatus and an ideal synthesis result of these images.
Figure 28B:
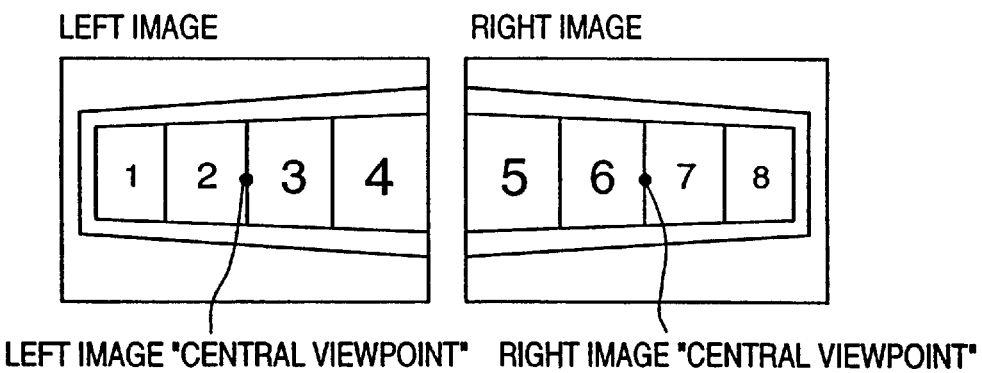
Figure 28C:
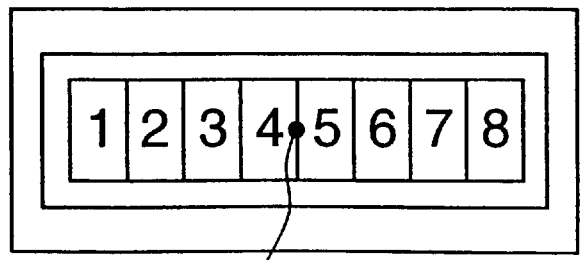

FIGS. 13A to 13C depict images sensed in the panoramic mode using the right and left optical elements which have trapezoidal distortion in their imaging performance. Owing to trapezoidal distortion that makes a portion to be joined (central portion) of an image be shorter than the outer side, both the right and left images, in which central portions are corrected without being apparently improved unlike the prior art in which neither of right and left optical elements have distortion (FIGS. 28A to 28C), and are apparently located at the central viewpoint of an ideally synthesized image, are obtained (FIGS. 13A and 13B). By joining these images, an image which is nearly the same as the ideally synthesized image can be obtained, as shown in FIG. 13C.

In the fourth embodiment, the number of multi-eyes used for obtaining a panoramic image by synthesis is two, i.e., right and left eyes, for the sake of simplicity. In general, when a horizontally elongated image is obtained by synthesis, a multi-eye image sensing apparatus which has three or more image sensing optical systems in line may be used. In such case, larger trapezoidal distortions can be produced in outer cameras. When the number of image sensing systems is an odd number, the central image sensing system has no distortion.

In the fourth embodiment, the optical elements 31R and 31L are prisms each having offaxial reflecting surfaces that are asymmetric aspherical surfaces, and a plurality of refractive powers. Also, as an offaxial optical system block having offaxial reflecting surfaces, a hollow block, all the surfaces of which are reflecting surfaces, may be used, as disclosed in Japanese Patent Laid-Open Nos. 8-292371 and 8-292372.

[Fifth Embodiment]

Figure 14:
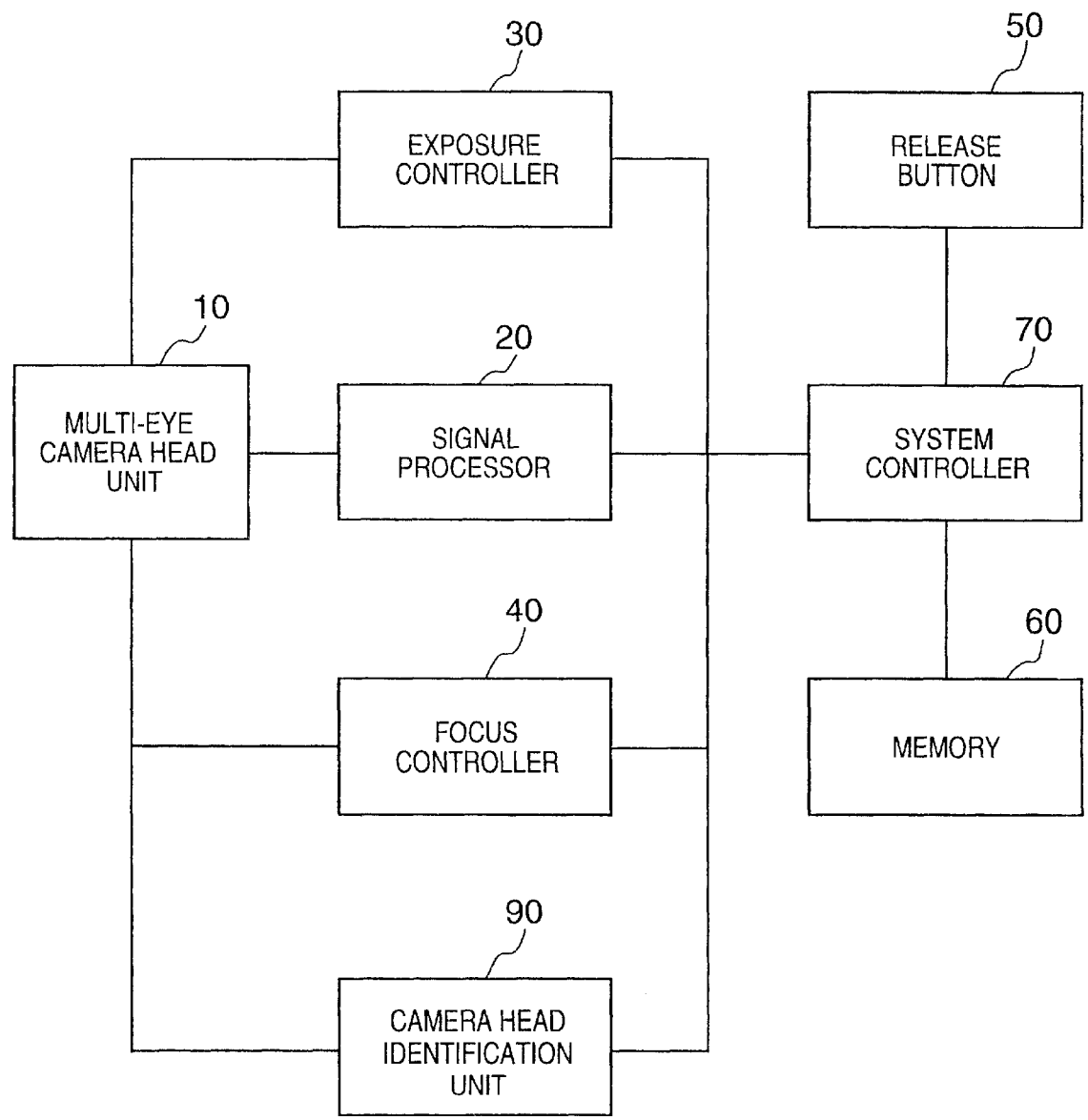
FIG. 14 is a block diagram showing the arrangement of a multi-eye image sensing apparatus according to the fifth embodiment of the present invention.

FIG. 14 is a block diagram showing the arrangement of a multi-eye image sensing apparatus according to the fifth embodiment.

As shown in FIG. 14, the multi-eye image sensing apparatus comprises a multi-eye camera head unit 10, which has a plurality of image sensing systems, senses images of an object using the respective image sensing systems, and outputs the sensed image signals of the object, and this multi-eye camera head unit 10 is exchangeable. Or by exchanging some building components of the head unit 10, a three-dimensional image sensing mode and panoramic image sensing mode can be switched. In this embodiment, two, right and left image sensing systems are built in the multi-eye camera head unit 10.

The multi-eye camera head unit 10 or its some building components mounted upon switching the image sensing mode are recognized by a camera head identification unit 90. More specifically, the camera head identification unit 90 recognizes the mounted multi-eye camera head unit 10 or its some building components, and outputs a recognition signal indicating that recognition result to a system controller 70 (to be described later).

Exposure control for the multi-eye camera head unit 10 is executed by an exposure controller 30. The exposure controller 30 controls driving that pertains to exposure value adjustment in the right and left image sensing systems of the multi-eye camera head unit 10 in accordance with the brightness of the object. Focus control for the multi-eye camera head unit 10 is done by a focus controller 40. The focus controller 40 controls driving that pertains to focus adjustment of the right and left image sensing systems of the multi-eye camera head unit 10. The control processes of the focus controller 40 and exposure controller 30 are executed in accordance with an instruction signal from the system controller 70, as will be described later.

Image signals output from the multi-eye camera head unit 10 are input to a signal processor 20, which converts the input image signals into image data of a predetermined format by executing, e.g., a JPEG image signal process of the image signals, and generates information signals used in focus adjustment control and exposure control on the basis of the input image signals. These image data and information signals are input to the system controller 70. The system controller 70 stores the input image data in a memory 60, and performs a predetermined image process for the stored image data. Also, the system controller 70 generates instruction signals to be supplied to the exposure controller 30 and focus controller 40 on the basis of the input information signals. Furthermore, the system controller 70 receives the recognition signal from the camera head identification unit 90, recognizes the corresponding image sensing mode that can be executed on the basis of the recognition signal, and executes the corresponding control.

A release button 50 that instructs the start of image sensing is connected to the system controller 70. Upon depression of the release button 50, the system controller 70 generates a signal that instructs the start of image sensing, and outputs it to the corresponding blocks.

Figure 15A:
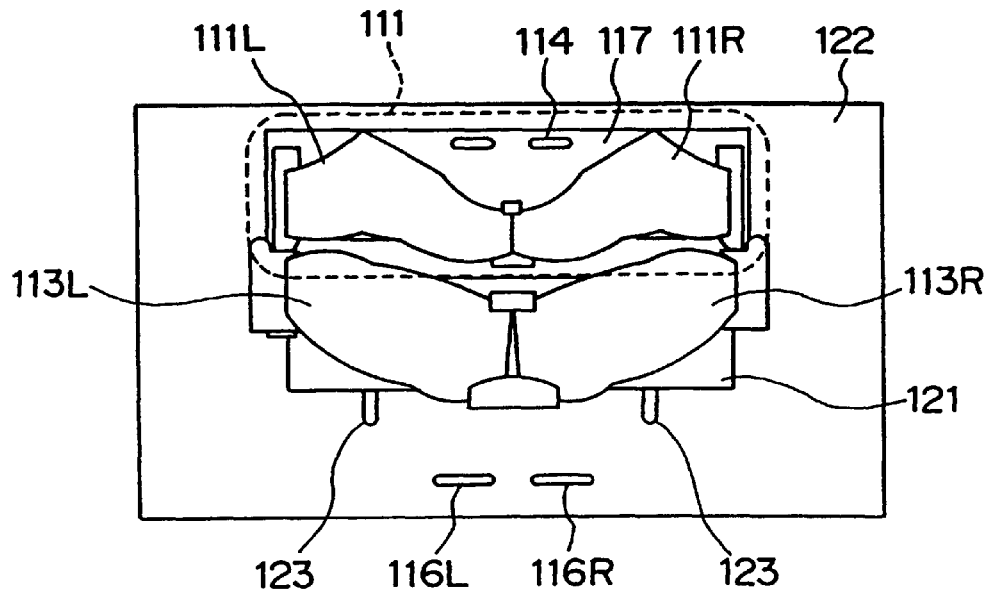
FIGS. 15A and 15B are views showing the detailed arrangements of a multi-eye camera head unit in the respective image sensing modes of the multi-eye image sensing apparatus shown in FIG. 14.
Figure 15B:
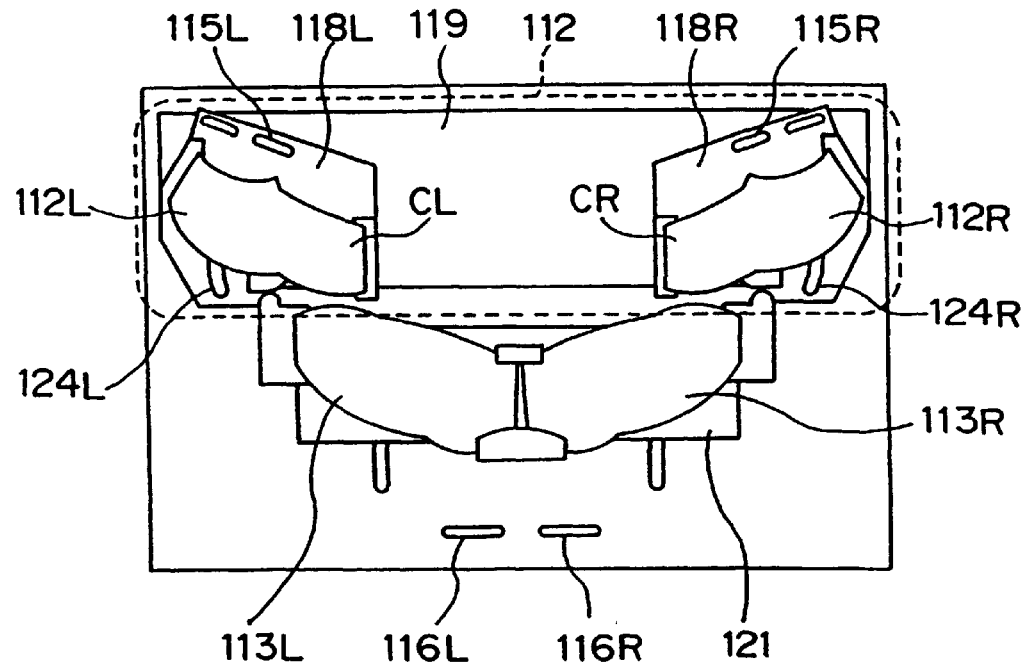
Figure 16A:
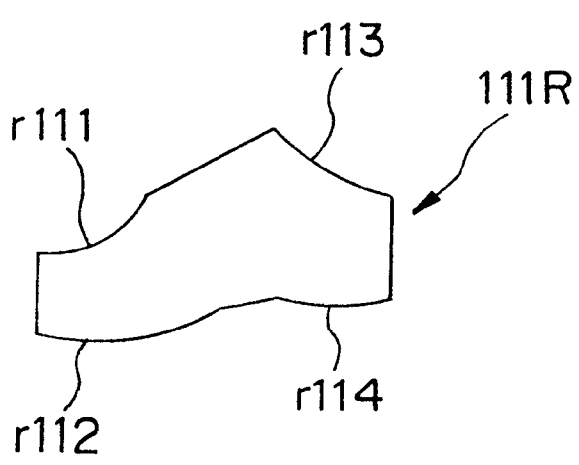
FIGS. 16A and 16B are views showing the arrangements of optical elements on the object side in the multi-eye camera head unit in the respective image sensing modes shown in FIGS. 15A and 15B.
Figure 16B:
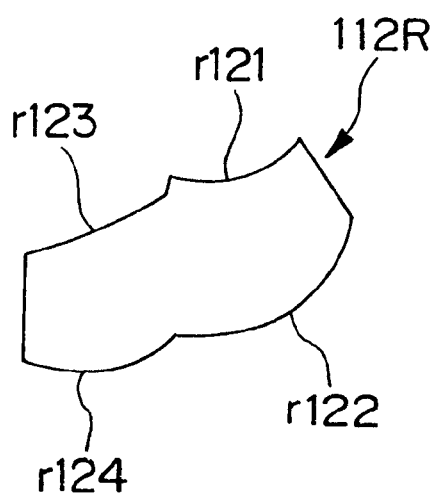
Figure 17:
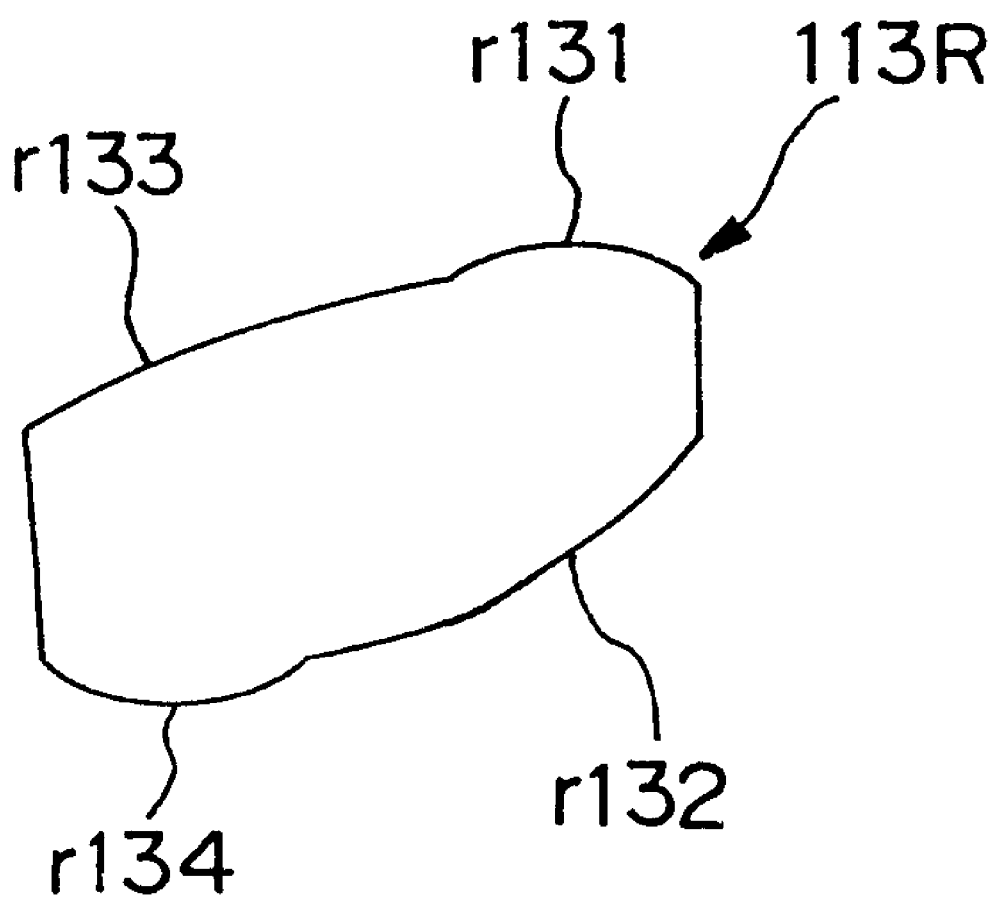
FIG. 17 is a view showing the arrangement of an optical element on the image side in the multi-eye camera head unit in the respective image sensing modes shown in FIGS. 15A and 15B.

The arrangement of the multi-eye camera head unit 10 will be described below with reference to FIGS. 15A, 15B, 16A, 16B, and 17. FIGS. 15A and 15B show the detailed arrangements of the multi-eye camera head unit in the respective image sensing modes of the multi-eye image sensing apparatus shown in FIG. 14, FIGS. 16A and 16B show the arrangements of an optical element on the object side in the multi-eye camera head unit in the respective image sensing modes shown in FIGS. 15A and 15B, and FIG. 17 shows the arrangement of an optical element on the image side in the multi-eye camera head unit in the respective image sensing modes shown in FIGS. 15A and 15B.

In the multi-eye camera head unit 10, a panoramic image sensing exchangeable camera head unit 111 shown in FIG. 15A, and a three-dimensional image sensing exchangeable camera head unit 112 shown in FIG. 15B are exchanged in correspondence with the image sensing mode selected. When the panoramic image sensing mode is selected, the panoramic image sensing exchangeable camera head unit 111 is built in a front surface portion (object side position) of the multi-eye camera head unit 10. The panoramic image sensing exchangeable camera head unit 111 includes a pair of optical elements 111R and 111L held by a holding member 117, and the optical elements 111R and 111L form offaxial optical systems, each of which has a plurality of reflecting and refracting surfaces and is formed of a transparent member such as glass or the like. More specifically, as shown in FIG. 16A, a concave refracting surface (entrance surface) r111 having a negative refractive power, reflecting surface r112, reflecting surface r113, and convex refracting surface (exit surface) r114 having a positive refractive power are formed on the surface of the optical element 111R in the order light rays coming from the object pass by. The concave refracting surface r111 and convex refracting surface r114 are formed into a spherical shape. The reflecting surfaces r112 and r113 have symmetry in a direction perpendicular to the plane of page of FIG. 16A, but have no symmetry in that plane of page, i.e., have a rotation-asymmetric aspherical shape as a whole. The optical element 111L has a shape symmetrical to the optical element 111R, and similarly has a concave refracting surface (entrance surface), two reflecting surfaces, and convex refracting surface (exit surface). That is, the optical element 111L can be obtained by inserting the same optical element as the optical element 111R upside down in the direction perpendicular to the plane of page.

The optical elements 111R and 111L can be fabricated by one-piece molding of, e.g., plastic, glass, or the like. Upon forming optical elements by one-piece molding under constant forming conditions, the characteristics of these optical elements vary less than a conventional system in which lenses are built in a lens barrel. Hence, multi-eye, right and left image sensing systems having a small difference in imaging performance therebetween can be obtained.

An iris 114 for limiting the amount of incoming light is inserted at a position (object side position) in front of the optical elements 111R and 111L, and is held by the holding member 117. The holding member 117 is detachably attached to a base 122.

As described above, the panoramic image sensing exchangeable camera head unit 111 is constructed by the iris 114, optical elements 111R and 111L, and the holding member 117. By attaching the holding member 117 to the base 122, the panoramic image sensing exchangeable camera head unit 111 can be built into the multi-eye camera head unit 110.

Optical elements 113R and 113L are placed behind this panoramic image sensing exchangeable camera head unit 111, as shown in FIG. 15A. The optical elements 113R and 113L have a plurality of reflecting and refracting surfaces and are formed of transparent members such as glass or the like. As shown in FIG. 17, a convex refracting surface (entrance surface) r131 having a positive refractive power, reflecting surface r132, reflecting surface r133, and convex refracting surface (exit surface) r134 having a positive refractive power are formed on the surface of the optical element 113R in the order light rays coming from the object pass by. The refracting surfaces r131 and r134 are formed into a spherical shape. The reflecting surfaces r132 and r133 have symmetry in a direction perpendicular to the plane of page of FIG. 17, but have no symmetry in that plane of page, i.e., have a rotation-asymmetric aspherical shape as a whole. The optical element 113L has a shape similar to that of the optical element 113R, and similarly has a convex refracting surface (entrance surface), two reflecting surfaces, and convex refracting surface (exit surface). Hence, the optical element 113L can be obtained by inserting the same optical element as the optical element 113R upside down in the direction perpendicular to the plane of page. The optical elements 113R and 113L can be fabricated by one-piece molding of, e.g., plastic, glass, or the like. Upon forming optical elements by one-piece molding under constant forming conditions, multi-eye, right and left image sensing systems having a small difference in imaging performance therebetween can be obtained as in the optical elements 111R and 111L. The optical elements 113R and 113L are held by a holding member 121. The holding member 121 is movably held by the base 122. More specifically, the holding member 121 is movable along a pair of guide grooves 123 formed in the base 122. Upon movement of the holding member 121, the imaging positions of the optical elements 113R and 113L can be adjusted. That is, the focus is adjusted by moving the holding member 121.

Image sensing elements 116R and 116L comprising, e.g., CCDs or the like are placed at the imaging positions of light beams output from the optical elements 113R and 113L. The image sensing elements 116R and 116L are fixed to the base 122. The image sensing element 116L builds the left image sensing system in cooperation with the iris 114 and optical elements 111L and 113L, and the image sensing element 116R builds the right image sensing system in cooperation with the iris 114 and optical elements 111R and 113R.

Upon selecting the three-dimensional image sensing mode, the three-dimensional image sensing exchangeable camera head unit 112 shown in FIG. 15B is built in the front surface portion (object side position) of the multi-eye camera head unit 10. The three-dimensional image sensing exchangeable camera head unit 112 includes a pair of optical elements 112R and 112L, which form offaxial optical systems that have a plurality of reflecting and refracting surfaces and are formed of transparent members such as glass or the like. More specifically, as shown in FIG. 16B, a concave refracting surface (entrance surface) r121 having a negative refractive power, reflecting surface r122, reflecting surface r123, and convex refracting surface (exit surface) r124 having a positive refracting power are formed on the surface of the optical element 112R in the order light rays coming from the object pass by. The refracting surfaces r121 and r124 are formed into a spherical shape. The reflecting surfaces r122 and r123 have symmetry in a direction perpendicular to the plane of page of FIG. 16B, but have no symmetry in that plane of page, i.e., have a rotation-asymmetric aspherical shape as a whole. The optical element 112L is symmetrical to the optical element 112R, and similarly has a concave refracting surface (entrance surface), two reflecting surfaces, and convex refracting surface (exit surface). That is, the optical element 112L can be obtained by inserting the same optical element as the optical element 112R upside down in the direction perpendicular to the plane of page. The optical elements 112R and 112L are respectively held by holding members 118R and 118L.

The optical elements 112R and 112L can be fabricated by one-piece molding of plastic, glass, or the like as in the optical elements 111R and 111L, and can construct multi-eye, right and left imaging optical systems having a small difference in their imaging performance therebetween.

Irises 115R and 115L for limiting the amounts of incoming light are respectively set at positions (object side positions) in front of the optical elements 112R and 112L, and are respectively held by the holding members 118R and 118L. The holding members 118R and 118L are rotatably held by a holding member 119. More specifically, the holding members 118R and 118L are rotatable about points CR and CL (FIG. 15B) as the centers while being guided along cam grooves 124R and 124L formed on the holding member 119, and upon rotation of the holding members 118R and 118L, the convergence angle changes. The points CR and CL are located at the central points of curvature of the convex refracting surfaces (exit surfaces) of the optical elements 112R and 112L. The holding members 118R and 118L abut against the holding member 121 via spring members (not shown) so as to rotate to follow movement of the holding member 121 along the grooves 123. More specifically, in the three-dimensional image sensing mode, the convergence angle can be automatically changed in correspondence with object distance.

As described above, the three-dimensional image sensing exchangeable camera head unit 112 is comprised of the irises 115R and 115L, optical elements 112R and 112R, holding members 118R and 118L, and holding member 119, and the holding member 119 is detachably attached to the base 122. Hence, by attaching the holding member 119 to the base 122, the three-dimensional image sensing exchangeable camera head unit 112 can be built in the multi-eye camera head unit 10. The iris 115L, optical elements 112L and 113L, and image sensing element 116L construct the left image sensing system in cooperation with each other, and the iris 115R, optical elements 112R and 113R, and image sensing element 116R construct the right image sensing system in cooperation with each other.

With the aforementioned arrangement, image sensing can be done in the panoramic image sensing mode by assembling the panoramic image sensing exchangeable camera head unit 111 in the multi-eye camera head unit 10, and can be done in the three-dimensional image sensing mode by assembling the three-dimensional image sensing exchangeable camera head unit 112 in the multi-eye camera head unit 10.

Figure 18:
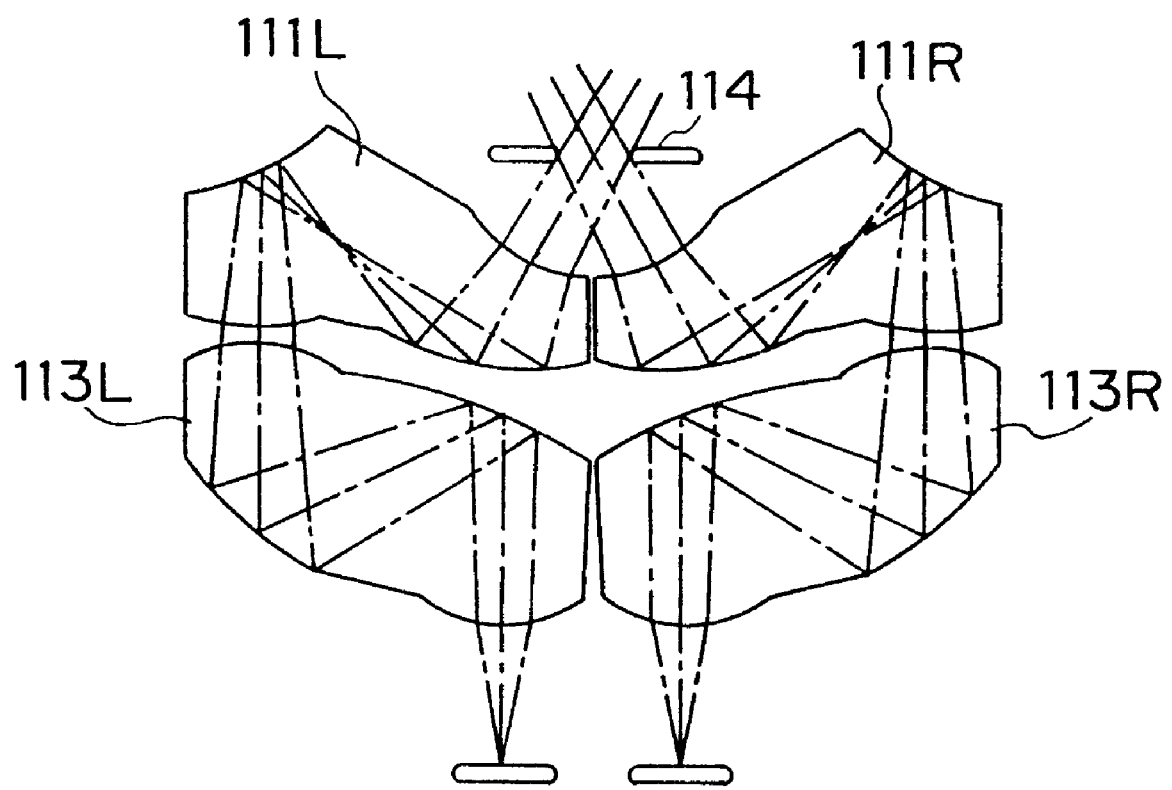
FIG. 18 is a view showing the optical paths in the multi-eye camera head unit in the panoramic image sensing mode.
Figure 19A:
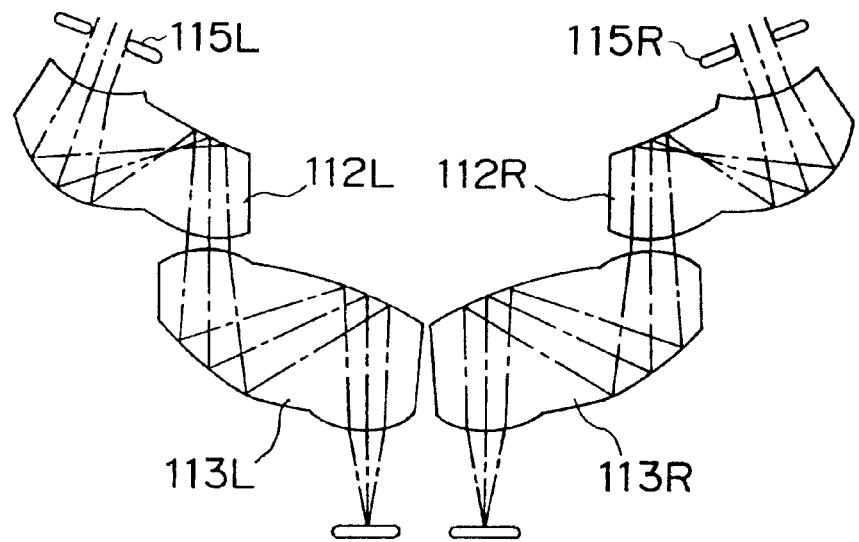
FIGS. 19A and 19B are views showing the optical paths in the multi-eye camera head unit in the three-dimensional image sensing mode.
Figure 19B:
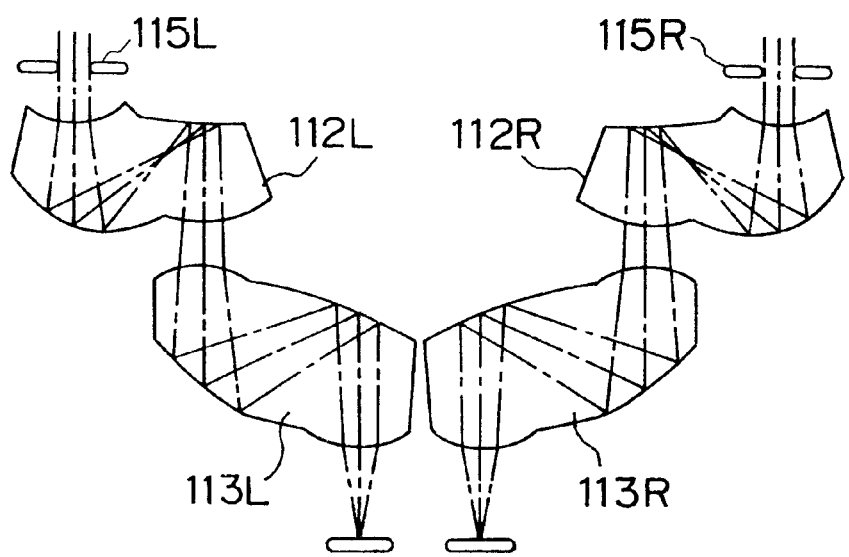

The optical paths in the respective image sensing modes will be explained below with reference to FIG. 18 and FIGS. 19A and 19B. FIG. 18 shows the optical paths in the multi-eye camera head unit in the panoramic image sensing mode, and FIGS. 19A and 19B show the optical paths in the multi-eye camera head unit in the three-dimensional image sensing mode.

In the panoramic image sensing mode, as described above, the panoramic image sensing exchangeable camera head unit 111 is built in the multi-eye camera head unit 10. In this embodiment, the route along which a light ray (reference light ray) that passes through the center of the light ray effective diameter of the iris 114 and reaches the center of the final imaging surface is refracted and reflected by the respective refracting and reflecting surfaces is set as a reference axis. The imaging operation of the right and left image sensing systems in the panoramic image sensing mode will be explained below taking the right image sensing system as an example. As shown in FIG. 18, an incoming light beam from the object enters the entrance surface r111 of the optical element 111R after its amount of light is limited by the iris 114, and is reflected by the reflecting surfaces r112 and r113. After that, the light beam exits the optical element 111R from the exit surface r114. Note that an object image is temporarily formed (intermediate imaging) at a position near the reflecting surface r113. The reason why intermediate imaging is done at the position near the reflecting surface r113 is to prevent the size of the image sensing system from becoming larger by converging the incoming light beam from the entrance surface r111 by the reflecting surface r113. This contributes to a size reduction of the apparatus.

The light beam emerging from the exit surface r114 enters the entrance surface r131 of the optical element 113R. The light beam is reflected by the reflecting surfaces r132 and r133, and then exits the element 113R from the exit surface r134, thus forming an image on the image sensing surface of the image sensing element 116R. At this time, the entrance reference axes of the optical elements 111R and 111L cross at the iris 114. With this arrangement, the viewpoints of the right and left image sensing systems can be roughly matched with each other. Note that the left image sensing system senses the right image sensing range, and the right image sensing system senses the left image sensing range, in an example shown in FIGS. 28A to 28C. In general, when an offaxial optical system uses a "front iris" type, i.e., an iris is placed at a position closest to the object, the optical system can be rendered easily compact. Such "front iris" type optical system is suitable for the panoramic image sensing mode in which the right and left incident pupil positions of the multi-eye optical systems match. Hence, using the "front iris" type offaxial optical system, a compact multi-eye image sensing apparatus capable of panoramic mode image sensing, which is hardly attained by a coaxial optical system, can be realized.

Note that a description of the optical path of the left image sensing system is omitted. In the left image sensing system as well, an incoming light beam forms an image on the image sensing element 116L along a similar route to that of the right image sensing system, although it is symmetrical to the route of the right image sensing system.

The optical paths in the three-dimensional image sensing mode will be explained below. In the three-dimensional image sensing mode, as described above, the three-dimensional image sensing exchangeable camera head unit 10 is built in the multi-eye camera head unit 10. The imaging operation of the right and left image sensing systems in the three-dimensional image sensing mode will be explained below taking the right image sensing system as an example.

When the object is located at a near distance position, the focal position is adjusted by the optical elements 113R and 113L by moving the holding member 121, as shown in FIG. 19A. The holding members 118R and 118L rotate in cooperation with the movement of the holding member 121 to set a convergence angle corresponding to the rotation angles of the holding members 118R and 118L. In the right image sensing system, an incoming light beam from the object enters the entrance surface r121 of the optical element 112R after its amount of light is limited by the iris 115R, and is reflected by the reflecting surfaces r122 and r123. The light beam then leaves the element 112R from the exit surface r124. Note that an object image is temporarily formed (intermediate imaging) at a position near the reflecting surface r123. The reason why intermediate imaging is done at the position near the reflecting surface r123 is to prevent the size of the image sensing system from becoming larger by converging the incoming light beam from the entrance surface r121 by the reflecting surface r122. This contributes to a size reduction of the apparatus.

The light beam emerging from the exit surface r124 enters the entrance surface r131 of the optical element 113R, is reflected by the reflecting surfaces r132 and r133, and exits the element 113R from the exit surface r134, thus forming an image on the image sensing surface of the image sensing element 116R. Note that a description of the optical path of the left image sensing system is omitted. In the left image sensing system as well, an incoming light beam forms an image on the image sensing element 116L along a similar route to that of the right image sensing system, although it is symmetrical to the route of the right image sensing system.

By contrast, when the object is located at a far distance position, the focal position is adjusted by the optical elements 113R and 113L by moving the holding member 121, as shown in FIG. 19B. The holding members 118R and 118L rotate in cooperation with the movement of the holding member 121 to set a convergence angle corresponding to the rotation angles of the holding members 118R and 118L. This convergence angle assumes a value smaller than that set when the object is located at a near distance position. When distance to the object is large enough, nearly zero convergence angle is set, and the reference axes of the right and left image sensing systems are parallel to each other. A light beam that comes from the object in the state wherein the convergence angle is appropriately set in correspondence with object distance forms images on the image sensing surfaces of the image sensing elements 116R and 116L along the same routes as those when the object is located at a near distance position.

The brightness values of the object are respectively detected from right and left image data obtained after the signal processing of image signals output from the elements 116R and 116L, and the exposure controller 30 determines the aperture values and shutter speeds based on the detected brightness values and drives the iris 114 or the irises 115R and 115L using the determined aperture values. Also, exposure is done on the image sensing elements 116R and 116L at the determined shutter speeds.

Upon completion of recognition of the image sensing mode, focus control, and exposure control, image signals obtained by the image sensing elements 116R and 116L in the right and left image sensing systems are input to the signal processor 20, which converts the input image signals into image data, executes corresponding processes for the image data on the basis of the recognition result of the image sensing mode, and stores the processed data in the memory 60.

As described above, in the fifth embodiment, the panoramic and three-dimensional image sensing exchangeable camera head units 111 and 112 are respectively constructed using the optical elements 111R and 111L, and 112R and 112L as offaxial optical systems, and the three-dimensional image sensing mode that produces disparity between the right and left image sensing systems, and the panoramic image sensing mode that nearly matches the viewpoints of the right and left image sensing systems each other are switched by exchanging the panoramic and three-dimensional image sensing exchangeable camera head units 111 and 112, thus easily attaining a size reduction of the apparatus.

In the three-dimensional image sensing exchangeable camera head unit 112, since the optical elements 112R and 112L rotate in correspondence with object distance, the convergence angle can be easily appropriately adjusted in correspondence with the object distance.

In this embodiment, the right and left image sensing systems are built using the four optical elements. Alternatively, in the panoramic image sensing exchangeable camera head unit 111, a one-piece optical element that integrates the optical elements 111R and 111L may be used, and a one-piece optical element that integrates the optical elements 113R and 113L may be used.

In this embodiment, the optical elements 111R, 111L, 112R, 112L, 113R, and 113L that form the right and left image sensing systems use offaxial optical systems. Since high degree of freedom in layout of the entrance and exit reference axes is realized when the offaxial optical system blocks are included in the optical systems, some of the optical elements may be replaced by conventional coaxial optical systems.

Furthermore, in this embodiment, optical blocks which have offaxial reflecting surfaces that are asymmetric aspherical surfaces, and a plurality of refractive powers have been exemplified as the optical elements 111R, 111L, 112R, 112L, 113R, and 113L. As an offaxial optical system having offaxial reflecting surfaces, a hollow block, all the surfaces of which are reflecting surfaces, may be used, as disclosed in Japanese Patent Laid-Open Nos. 8-292371 and 8-292372.

Moreover, this embodiment has exemplified the switching arrangement between the three-dimensional image sensing mode that produces disparity between the right and left image sensing systems, and the panoramic image sensing mode that nearly matches the viewpoints of the right and left image sensing systems with each other. Also, an exchangeable camera head unit for another image sensing mode, e.g., a high-quality image sensing exchangeable camera head unit may be prepared, and a high-quality image sensing mode may be selected. In this case, the high-quality image sensing exchangeable camera head unit may be designed to have slightly offset right and left image sensing ranges. By executing a predetermined process for the right and left images obtained using this high-quality image sensing exchangeable camera head unit, the high-quality image sensing mode that can obtain a high-quality image even when low-resolution image sensing elements are used can be selected.

[Sixth Embodiment]

Figure 20:
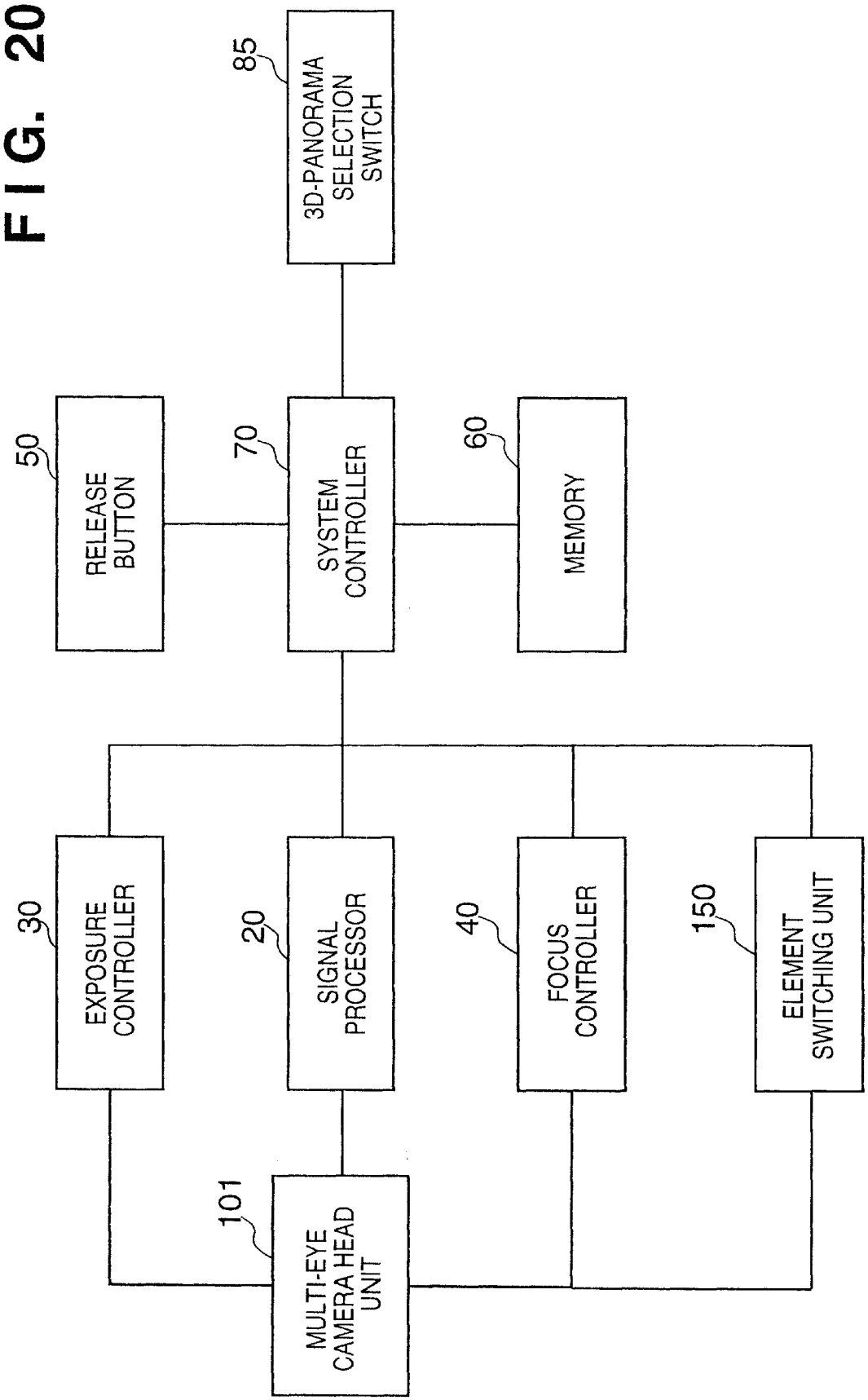
FIG. 20 is a block diagram showing the arrangement of a multi-eye image sensing apparatus according to the sixth embodiment of the present invention.
Figure 21A:
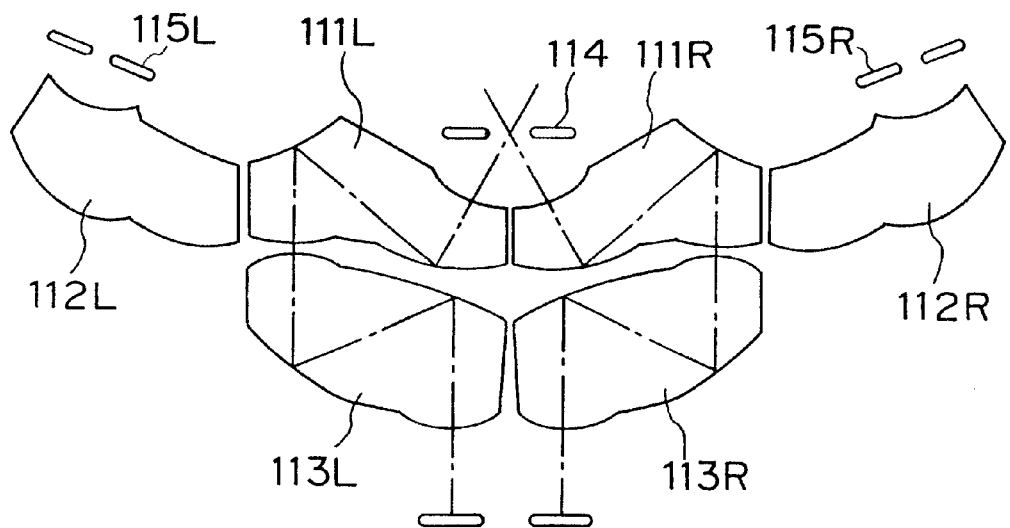
FIGS. 21A and 21B are views showing the switching arrangements of the respective optical system blocks in a multi-eye camera head unit of the multi-eye image sensing apparatus shown in FIG. 20.
Figure 21B:
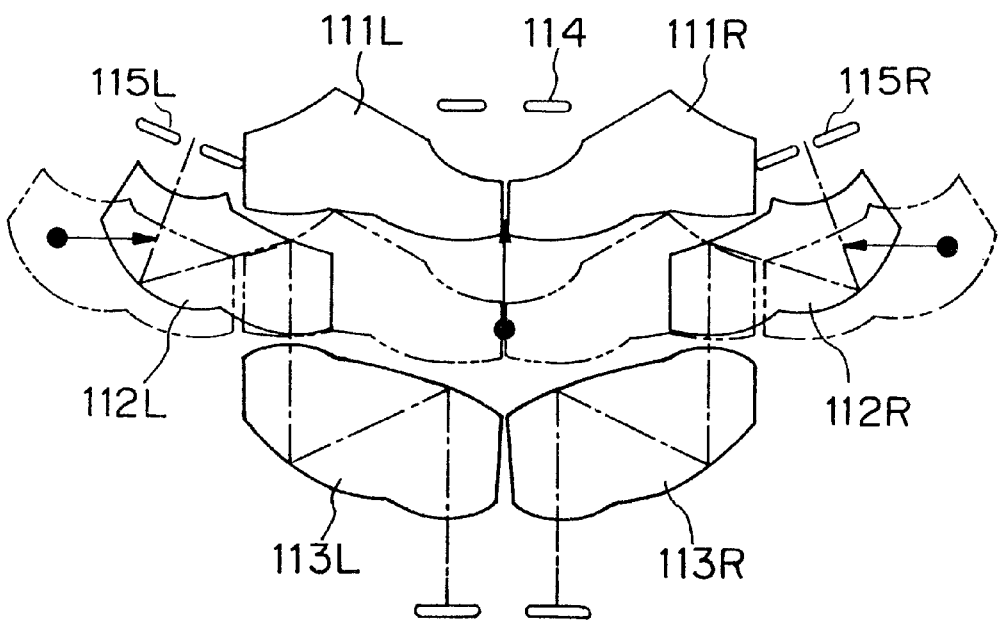
Figure 22A:
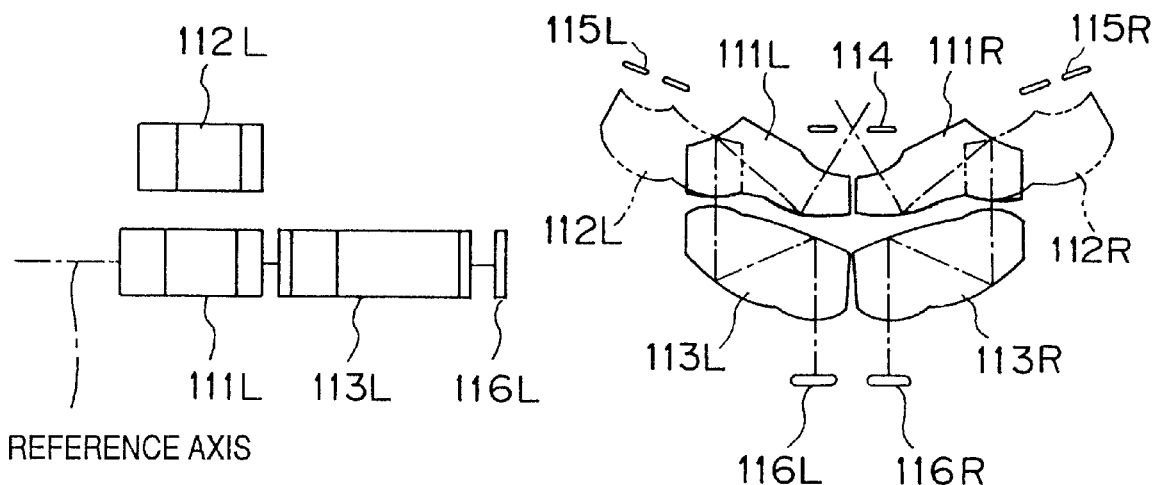
FIGS. 22A and 22B are views showing the switching arrangements of the respective optical system blocks in another multi-eye camera head unit which is applied to the multi-eye image sensing apparatus shown in FIG. 20.
Figure 22B:
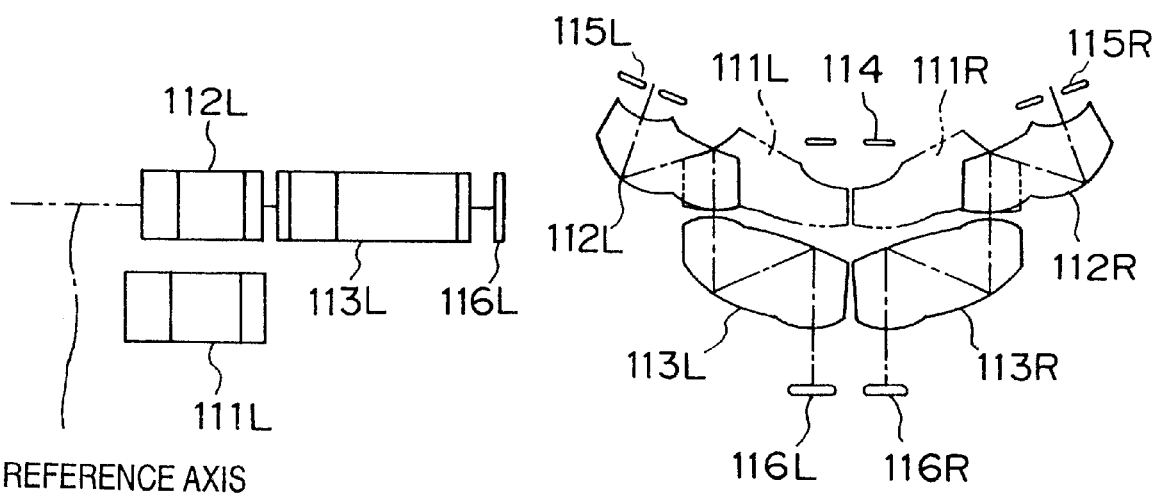

The sixth embodiment will be described below with reference to FIGS. 20, 21A, 21B, 22A, and 22B. FIG. 20 is a block diagram showing the arrangement of a multi-eye image sensing apparatus of the sixth embodiment, FIGS. 21A and 21B show the switching arrangements of respective optical system blocks in a multi-eye camera head unit of the multi-eye image sensing apparatus shown in FIG. 20, and FIGS. 22A and 22B show the switching arrangements of respective optical system blocks in another multi-eye camera head unit which is applied to the multi-eye image sensing apparatus shown in FIG. 20. Note that the same reference numerals in this embodiment denote the same blocks and members as those in the fifth embodiment, and a detailed description thereof will be omitted.

As shown in FIG. 20, the multi-eye image sensing apparatus comprises a multi-eye camera head unit 101, which has a plurality of image sensing systems, senses images of an object using the respective image sensing systems, and outputs the sensed image signals of the object. More specifically, the multi-eye camera head unit 101 has a panoramic image sensing optical system block that nearly matches the viewpoints of the right and left image sensing systems with each other, and a three-dimensional image sensing optical system block that produces disparity between the right and left image sensing systems, which blocks are selectable. One of a panoramic image sensing mode and three-dimensional image sensing mode is selected by selecting the optical system block. The optical system block is selected by an element switching unit 150. The element switching unit 150 selects the corresponding optical system block on the basis of an instruction from a system controller 70. The switching arrangement of the optical system blocks will be described later.

Exposure control for the multi-eye camera head unit 101 is executed by an exposure controller 30, and focus control for the multi-eye camera head unit 101 is executed by a focus controller 40.

Image signals output from the multi-eye camera head unit 101 are input to a signal processor 20, which converts the input image signals into image data of a predetermined format by executing, e.g., a JPEG image signal process of the image signals, and generates information signals used in focus adjustment control and exposure control on the basis of the input image signals. These image data and information signals are input to the system controller 70. The system controller 70 stores the input image data in a memory 60, and performs a predetermined image process for the stored image data. Also, the system controller 70 generates instruction signals to be supplied to the exposure controller 30 and focus controller 40 on the basis of the input information signals. A release button 50 for instructing the start of image sensing is connected to the system controller 70, and a 3D-panorama selection switch 85 for instructing switching to the three-dimensional image sensing mode or panoramic image sensing mode is also connected. Upon instruction switching to the three-dimensional image sensing mode or panoramic image sensing mode by the 3D-panorama selection switch 85, the system controller 70 directs the element switching unit 150 to select the optical system block corresponding to the instructed image sensing mode.

The arrangement of the multi-eye camera head unit 101 will be explained below with reference to FIGS. 21A and 21B.

In the multi-eye camera head unit 101, one of the panoramic image sensing optical system block and three-dimensional image sensing optical system block is selected in correspondence with the image sensing mode. The panoramic image sensing optical system block is constructed by an iris 114, two optical elements 111R and 111L, and a holding member (not shown) for holding these members. The three-dimensional image sensing optical system block is constructed by two irises 115R and 115L, optical elements 112R and 112L, and a holding member (not shown) for holding these members. Note that the detailed arrangement of the individual optical system blocks (including that of each optical element) are nearly the same as that in the fifth embodiment mentioned above, and a detailed description thereof will be omitted.

The panoramic image sensing optical system block and three-dimensional image sensing optical system block are movable along a plane including reference axes, and are moved by the element switching unit 150 in correspondence with the selected image sensing mode.

When the panoramic image sensing mode is selected, the panoramic image sensing optical system block is aligned to a position in front of optical elements 113R and 113L, as shown in FIG. 21A. In this state, the iris 115L and optical element 112L that constitute the left image sensing system of the three-dimensional image sensing optical system block are retracted to the position on the left side of the optical element 111L in the panoramic image sensing optical system block, and the iris 115R and optical element 112R that constitute the right image sensing system are retracted to the position on the right side of the optical element 111R. The optical path in the panoramic image sensing mode is the same as that in the fifth embodiment described above, and a description thereof will be omitted.

When switching to the three-dimensional image sensing mode is instructed while the panoramic image sensing mode is selected, the panoramic image sensing optical system block is moved forward (to the object side) and is retracted to a predetermined position, as shown in FIG. 21B. Subsequently, the iris 115L and optical element 112L that construct the left image sensing system in the three-dimensional image sensing optical system block are moved rightward, and are held at a position to have a predetermined positional relationship with the optical element 113L. Upon instruction of switching from the three-dimensional image sensing mode to the panoramic image sensing mode, such switching is done by operations opposite to that described above.

The optical path upon selection of the three-dimensional image sensing mode is the same as that in the fifth embodiment, and a detailed description thereof will be omitted. Also, the arrangement for changing the convergence angle in correspondence with object distance is the same as that in the fifth embodiment, and a detailed description thereof will be omitted.

In this manner, since the panoramic image sensing mode and three-dimensional image sensing mode can be switched by switching between the panoramic image sensing optical system block and three-dimensional image sensing optical system block, a size reduction of the apparatus can be easily attained.

In this embodiment, the panoramic image sensing mode and three-dimensional image sensing mode are switched by moving the panoramic image sensing optical system block and three-dimensional image sensing optical system block along the plane including the reference axes. However, the present invention is not limited to such specific switching method, and other switching methods may be used.

One of the other switching methods will be explained below with reference to FIGS. 22A and 22B.

In this example, the panoramic image sensing optical system block and three-dimensional image sensing optical system block are stacked in a direction perpendicular to the plane including the reference axes, and are moved in the direction perpendicular to the plane including the reference axes, thereby switching between the panoramic image sensing mode and three-dimensional image sensing mode. The panoramic image sensing optical system block is constructed by the iris 114, two optical elements 111R and 111L, and a holding member (not shown) for holding these members, and the three-dimensional image sensing optical system block is constructed by the two irises 115R and 115L, optical elements 112R and 112L, and a holding member (not shown) for holding these members.

When the panoramic image sensing mode is selected, the panoramic image sensing optical system block is aligned to a position in front of the optical elements 113R and 113L to have a predetermined positional relationship with the optical elements 113R and 113L, as shown in FIG. 22A. In this state, the three-dimensional image sensing optical system block is retracted to a position above the plane including the reference axes.

When switching to the three-dimensional image sensing mode is instructed while the panoramic image sensing mode is selected, the three-dimensional image sensing optical system block is moved in the direction perpendicular to the plane including the reference axes, and is held at a position to have a predetermined positional relationship with the optical elements 113R and 113L, as shown in FIG. 22B. Upon movement of the three-dimensional image sensing optical system block, the panoramic image sensing-optical system block is moved and retracted to a position below the plane including the reference axes.

By moving the panoramic image sensing optical system block and three-dimensional image sensing optical block in the direction perpendicular to the plane including the reference axes in this manner, the panoramic image sensing mode and three-dimensional image sensing mode can be switched.

[Seventh Embodiment]

Figure 24A:
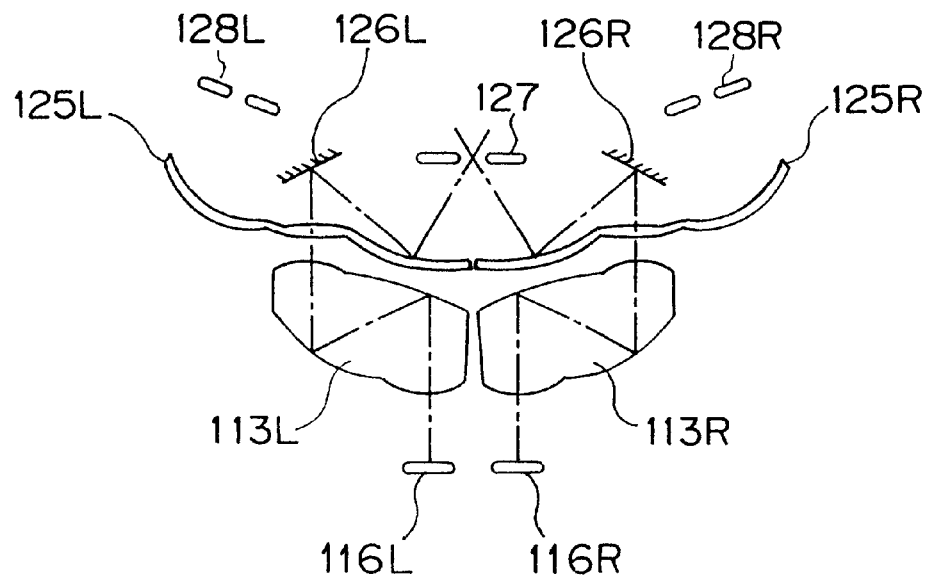
FIGS. 24A and 24B are views showing the switching arrangements of the respective optical system blocks in a multi-eye camera head unit of the multi-eye image sensing apparatus shown in FIG. 23.
Figure 24B:
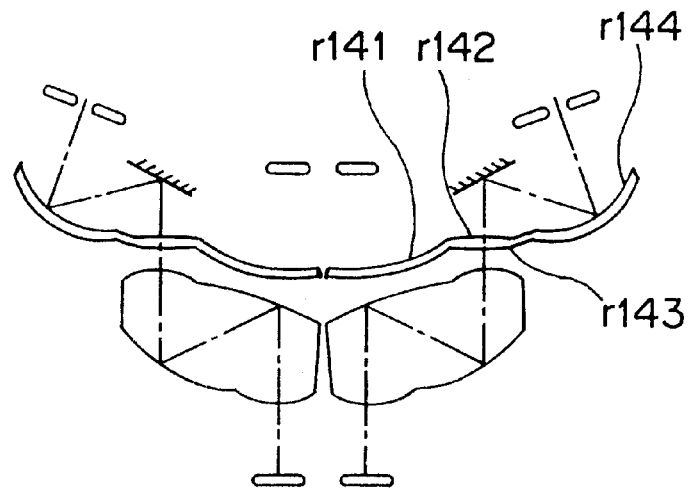

The seventh embodiment will be described below with reference to FIG. 23 and FIGS. 24A and 24B. FIG. 23 is a block diagram showing the arrangement of a multi-eye image sensing apparatus of the seventh embodiment, and FIGS. 24A and 24B show the switching arrangements of the respective optical system blocks in a multi-eye camera head unit of the multi-eye image sensing apparatus shown in FIG. 23. Note that the same reference numerals in this embodiment denote the same blocks and members as those in the fifth embodiment, and a detailed description thereof will be omitted.

As shown in FIG. 23, the multi-eye image sensing apparatus comprises a multi-eye camera head unit 102, which has a plurality of image sensing systems, senses images of an object using the respective image sensing systems, and outputs the sensed image signals of the object. More specifically, the multi-eye camera head unit 102 has an offaxial optical system block, which includes a three-dimensional image sensing optical path for producing disparity between the right and left image sensing systems, and a panoramic image sensing optical path for nearly matching the viewpoints of the right and left image sensing systems. The three-dimensional image sensing mode and panoramic image sensing mode can be switched by switching between the three-dimensional image sensing optical path and panoramic image sensing optical path by rotating offaxial reflecting surfaces in the offaxial optical system.

The optical paths are switched by an optical path switching unit 151. The optical path switching unit 151 selects the corresponding optical path on the basis of an instruction from a system controller 70. The switching arrangement of the optical paths will be explained later.

Exposure control for the multi-eye camera head unit 102 is executed by an exposure controller 30, and focus control for the multi-eye camera head unit 101 is executed by a focus controller 40.

Image signals output from the multi-eye camera head unit 102 are input to a signal processor 20, which converts the input image signals into image data of a predetermined format by executing, e.g., a JPEG image signal process of the image signals, and generates information signals used in focus adjustment control and exposure control on the basis of the input image signals. These image data and information signals are input to the system controller 70. The system controller 70 stores the input image data in a memory 60, and performs a predetermined image process for the stored image data. Also, the system controller 70 generates instruction signals to be supplied to the exposure controller 30 and focus controller 40 on the basis of the input information signals. A release button 50 for instructing the start of image sensing is connected to the system controller 70, and a 3D-panorama selection switch 85 for instructing switching to the three-dimensional image sensing mode or panoramic image sensing mode is also connected. Upon instruction switching to the three-dimensional image sensing mode or panoramic image sensing mode by the 3D-panorama selection switch 85, the system controller 70 directs the optical path switching unit 151 to select the optical path corresponding to the instructed image sensing mode.

The arrangement of the multi-eye camera head unit 102 will be explained below with reference to FIGS. 24A and 24B.

As shown in FIGS. 24A and 24B, the multi-eye camera head unit 102 has optical elements 125R and 125L for forming the panoramic and three-dimensional image sensing optical paths, and optical path switching plane mirrors 126R and 126L which are placed at positions (object side positions) in front of the optical elements 125R and 125L. The mirrors 126R and 126L are rotated by the optical path switching unit 151. Upon rotation of these mirrors 126R and 126L, the panoramic and three-dimensional image sensing optical paths are switched to one another. The optical elements 125R and 125L comprise offaxial optical system elements having a plurality of reflecting and refracting surfaces. More specifically, reflecting surfaces r141 and r144 and refracting surfaces r142 and r143 are formed on the surface of the optical element 125R, as shown in FIG. 24B. The refracting surfaces r142 and r143 are formed into a spherical shape, and the reflecting surfaces r141 and r144 have symmetry in the direction perpendicular to the plane of page of FIG. 24B, but have no symmetry in that plane of page, i.e., have a rotation-asymmetric aspherical shape as a whole. The optical element 125L has a shape symmetrical to that of the optical element 125R, and similarly has two reflecting surfaces and two refracting surfaces. Hence, the optical element 125L can be obtained by inserting the same optical element as the optical element 125R upside down in a direction perpendicular to the plane of page.

An iris 127 for the panoramic image sensing optical path, and two irises 128R and 128L for the three-dimensional image sensing optical path are placed at positions (object side positions) in front of the optical elements 125R and 125L.

Optical elements 113R and 113L are placed behind the optical elements 125R and 125L, and image sensing elements 116R and 116L are placed at positions behind the optical elements 113R and 113L, i.e., at imaging positions of light beams emerging from the optical elements 113R and 113L.

The optical paths in the respective image sensing modes will be explained below with reference to FIGS. 24A and 24B.

In the panoramic image sensing mode, the mirrors 126R and 126L are driven to be set at predetermined rotation angular positions. The imaging operations in the right and left image sensing systems in the panoramic image sensing mode will be explained below taking the right image sensing system as an example. As shown in FIG. 24A, an incoming light beam from the object is reflected by the entrance surface r141 of the optical element 125R after its amount of light is limited by the iris 127, is then reflected by the mirror 126R, and enters the optical element 113R via the refracting surface r142. The light beam that has entered the optical element 113R leaves the element 113R along the same route as that in the fifth embodiment, and forms an image on the image sensing surface of the image sensing element 116R. Note that a description of the optical path of the left image sensing system is omitted. In the left image sensing system as well, an incoming light beam forms an image on the image sensing element 116L along a similar route to that of the right image sensing system, although it is symmetrical to the route of the right image sensing system.

The optical paths in the three-dimensional image sensing mode will be described below. The imaging operations in the right and left image sensing systems in the three-dimensional image sensing mode will be explained below taking the right image sensing system as an example. In the three-dimensional image sensing mode, the mirrors 126R and 126L are rotated and held at corresponding angular positions, as shown in FIG. 24B.

In the right image sensing system, an incoming light beam from the object is reflected by the entrance surface r144 of the optical element 125R after its amount of light is limited by the iris 128R, is then reflected by the mirror 126R, and emerges from the refracting surface r143. The light beam emerging from the refracting surface r143 enters the optical element 113R, and the light beam that has entered the optical element 113R leaves the element 113R along the same route as that in the fifth embodiment, thus forming an image on the image sensing surface of the image sensing element 116R. Note that a description of the optical path of the left image sensing system is omitted. In the left image sensing system as well, an incoming light beam forms an image on the image sensing element 116L along a similar route to that of the right image sensing system, although it is symmetrical to the route of the right image sensing system.

In this manner, the panoramic and three-dimensional image sensing optical paths are switched to another upon rotation of the mirrors 126R and 126L, and upon switching the optical paths, the panoramic or three-dimensional image sensing mode is selected, thus allowing an easy size reduction of the apparatus.

In this embodiment, the mirrors 126R and 126L comprise plane mirrors but may use curved mirrors instead.

In this embodiment, the optical elements 113R and 113L that construct the right and left image sensing systems use offaxial optical systems. Since high degree of freedom in layout of the entrance and exit reference axes is realized when offaxial optical system blocks are included in the optical systems, the optical elements 113R and 113L may be replaced by conventional coaxial optical systems.

[Eighth Embodiment]

Figure 25:
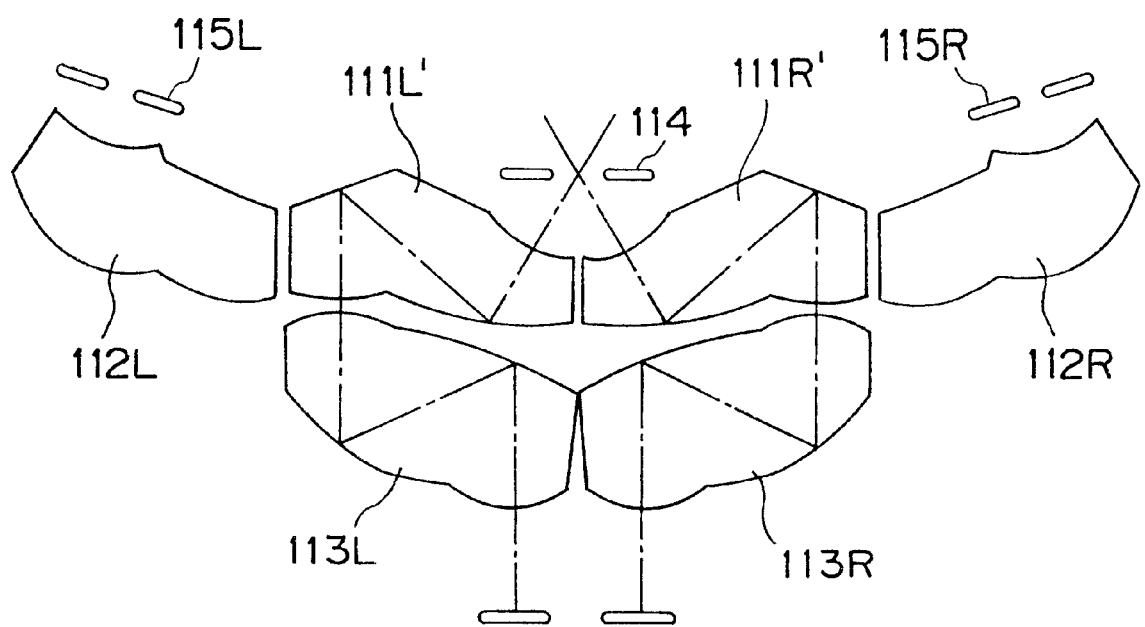
FIG. 25 is a view showing the arrangement of a multi-eye camera head unit in a multi-eye image sensing apparatus according to the eighth embodiment of the present invention.
Figure 26A:
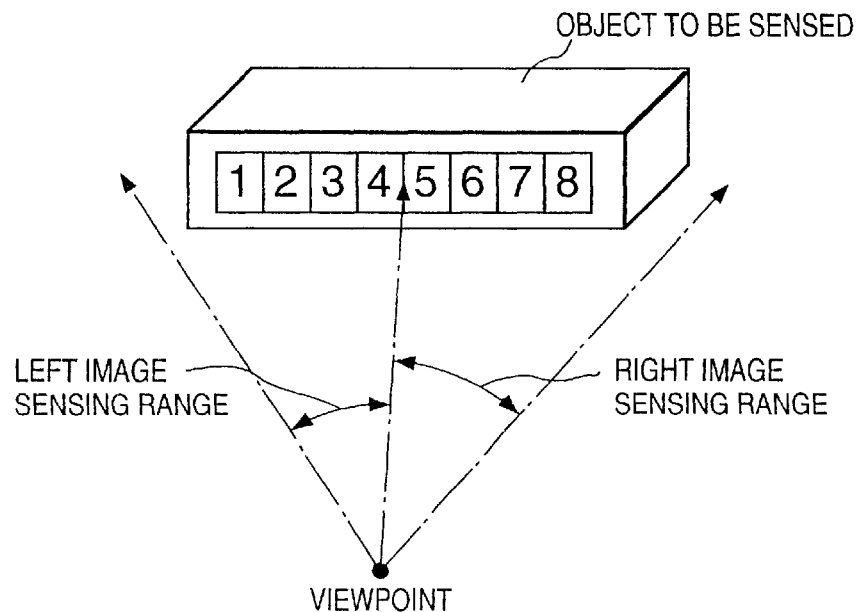
FIGS. 26A to 26C show an image sensing state in the panoramic image sensing mode of the multi-eye image sensing apparatus shown in FIG. 25.
Figure 26B:
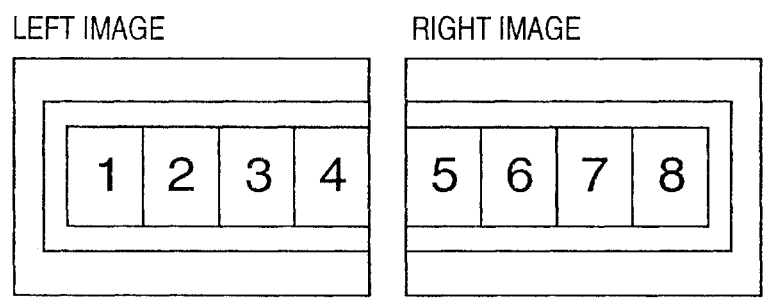
Figure 26C:
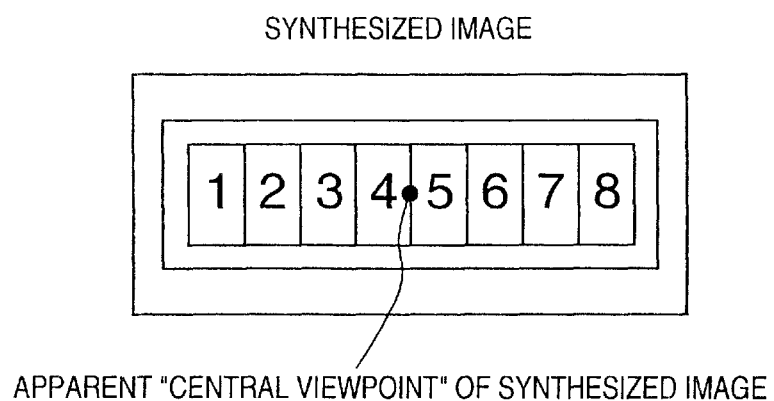
Figure 27:
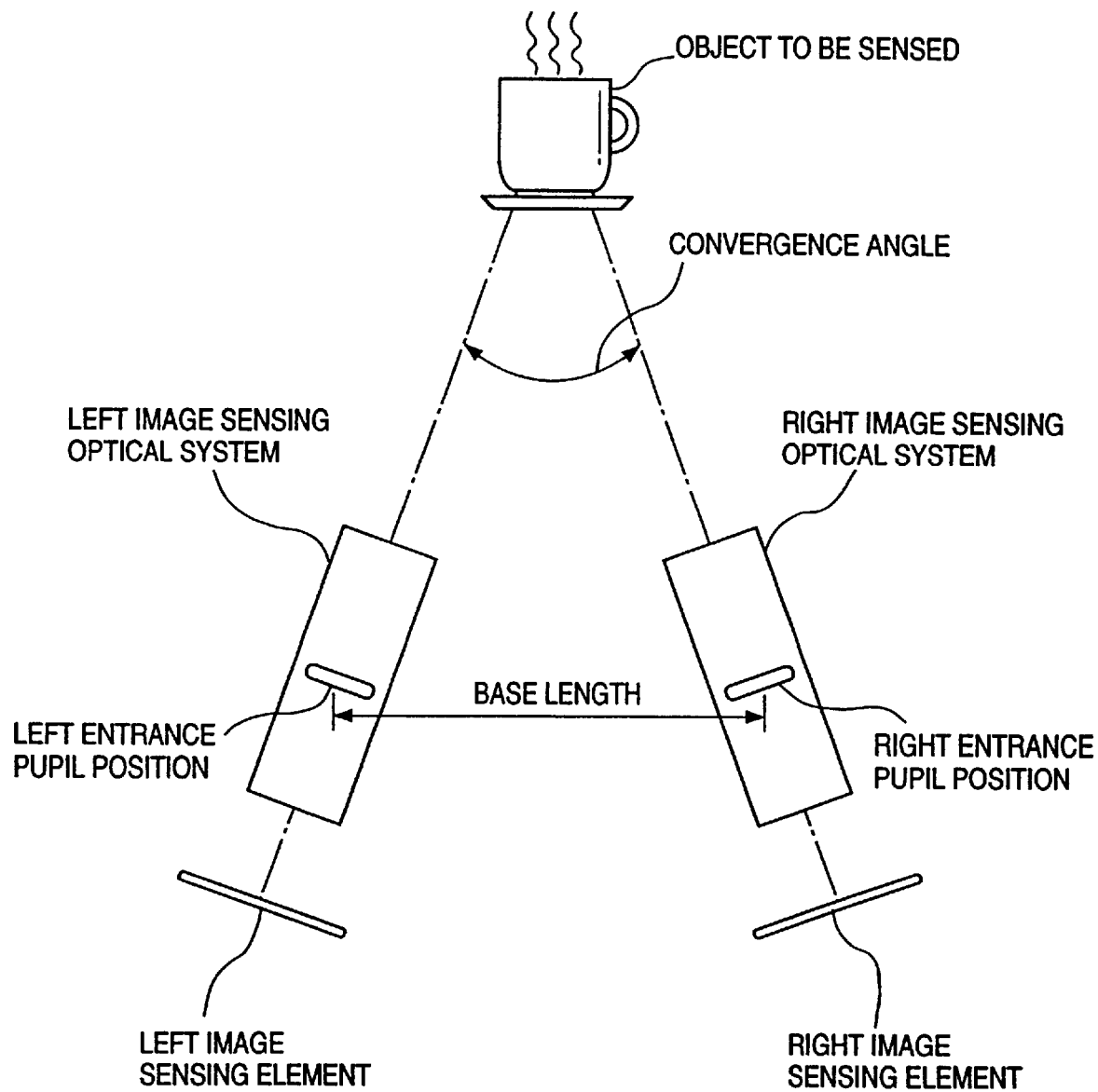
FIG. 27 depicts the layout of image sensing optical systems in a conventional multi-eye image sensing apparatus.

The eighth embodiment will be described below with reference to FIG. 25 and FIGS. 26A to 26C. FIG. 25 shows the arrangement of a multi-eye camera head unit of the eighth embodiment, and FIGS. 26A to 26C show the image sensing states in a panoramic image sensing mode of a multi-eye image sensing apparatus shown in FIG. 25.

This embodiment is different from the sixth embodiment described above in that optical elements 111R' and 11L' are used as those for constructing the panoramic image sensing optical system block to produce symmetric trapezoidal distortion in the imaging characteristics, as shown in FIG. 25.

In general, in an offaxial optical system, an asymmetric aspherical surface is mainly used as a reflecting surface. Hence, asymmetric aberrations that cannot be produced in a rotation-symmetric coaxial optical system unless it is decentered, can be easily produced. In this sense, the offaxial optical system is suitable for the panoramic image sensing mode.

In this embodiment, since asymmetric trapezoidal distortion is produced in the imaging characteristics upon sensing images of an object using the optical elements 111R' and 111L', an image in which "central viewpoints" of the right and left image sensing systems are apparently located at an ideal "central viewpoint" of a synthesized image can be obtained. More specifically, as shown in FIGS. 26A to 26C, when the right and left image sensing systems sense the corresponding image sensing ranges, the right side portion (a joint portion upon synthesizing the right and left images) of each of the right and left sensed images becomes shorter than its left side portion, and the "central viewpoints" of the right and left images apparently move to the joint portion upon synthesizing the right and left images. In other words, the "central viewpoints" of the right and left image sensing optical systems nearly match the ideal "central viewpoint" of the synthesized image, thus obtaining a synthesized image similar to the ideal synthesized image. As a result, upon joining the right and left sensed images, the need for executing an image process for removing apparent trapezoidal distortion due to the difference between the "central viewpoints" can be obviated, and the image quality can be prevented from deteriorating as a result of that image process.

The arrangement for producing asymmetric trapezoidal distortion in the imaging characteristics can also be applied to the fifth and seventh embodiments described above.

As many apparently widely different embodiments of the present invention can be made without departing from the spirit and scope thereof, it is to be understood that the invention is not limited to the specific embodiments thereof except as defined in the appended claims.

What is claimed is:

1. A multi-eye image sensing apparatus comprising:
a plurality of image sensing systems, wherein each of the plurality of image sensing systems (a) includes at least one offaxial optical system block which includes an offaxial reflecting surface that is an asymmetric aspherical surface and (b) has a refractive power sufficient to form a real image as a whole; and
a control system which switches between a panoramic image sensing mode and a three-dimensional image sensing mode by rotating the offaxial reflecting surface.

2. The multi-eye image apparatus according to claim 1, wherein each offaxial optical system block includes an offaxial reflecting surface which is a vertically symmetric and horizontally asymmetric aspherical surface, and the offaxial optical system blocks are provided to right and left image sensing systems of the plurality of image sensing systems upside down.

3. The multi-eye image apparatus according to claim 1, wherein each offaxial optical system block is prepared by molding.

4. The multi-eye image apparatus according to claim 1, wherein some or all components of the image sensing systems which include the offaxial optical system blocks are pivotal, whereby pivoting some or all components switches the multi-eye image apparatus between the three-dimensional image sensing mode, in which right and left image sensing systems of the plurality of image sensing systems have disparity, and the panoramic image sensing mode, in which viewpoints of the right and left image sensing systems substantially match.

5. The multi-eye image apparatus according to claim 1, wherein right and left image sensing systems of the plurality of image sensing systems form images by producing trapezoidal distortions having horizontally reversed patterns.

6. The multi-eye image apparatus according to claim 1, wherein the plurality of image sensing systems have entrance and exit reference axes located on different straight lines.

7. The multi-eye image apparatus according to claim 1, wherein each image sensing system has an iris immediately before an object-side entrance surface.

8. The multi-eye image apparatus according to claim 7, wherein each image sensing system has an iris immediately before an object-side entrance surface of the offaxial optical system block.

9. The multi-eye image apparatus according to claim 1, wherein each of the plurality of image sensing systems performs intermediate imaging at least once in the middle of an optical path that extends to an imaging surface.

10. The multi-eye image apparatus according to claim 1, wherein, for each offaxial optical system block, a plurality of reflecting surfaces that make surface reflection are formed on the offaxial optical system block, and an incoming light beam exits the offaxial optical system block after the light beam reflects on the plurality of reflecting surfaces.

11. A multi-eye image sensing apparatus having a plurality of image sensing systems,
wherein each of the plurality of image sensing systems (a) has at least one offaxial optical system block which includes an offaxial reflecting surface that is an asymmetric aspherical surface, and (b) has a refractive power sufficient to form a real image,
where each offaxial optical system block includes a three-dimensional image sensing optical path for producing disparity between right and left image sensing systems of the plurality of image sensing systems, and a panoramic image sensing optical path for substantially matching viewpoints of the right and left image sensing systems with each other, and
wherein rotation of the offaxial reflecting surface of a respective offaxial optical system block switches the respective image sensing system between three-dimensional and panoramic image sensing modes.

12. The multi-eye image apparatus according to claim 11, wherein the offaxial reflecting surface of each offaxial optical system block is an aspherical surface which is vertically symmetric and horizontally asymmetric, and the offaxial optical system blocks are built in the right and left image sensing systems upside down.

13. The multi-eye image apparatus according to claim 11, wherein each offaxial optical system block is prepared by molding.

14. The multi-eye image apparatus according to claim 11, wherein, for each offaxial optical system block, a plurality of reflecting surfaces that make surface reflection are formed on the offaxial optical system block, and an incoming light beam exits the offaxial optical system block after the light beam reflects on the plurality of reflecting surfaces.

15. The multi-eye image apparatus according to claim 11, wherein when an image is sensed in the panoramic image sensing mode, the plurality of image sensing systems form images by producing trapezoidal distortions having horizontally reversed patterns.

16. The multi-eye image apparatus according to claim 11, wherein the plurality of image sensing systems have entrance and exit reference axes located on different straight lines.

17. The multi-eye image apparatus according to claim 11, wherein each of the plurality of image sensing systems has an iris immediately before an object entrance surface.

18. The multi-eye image apparatus according to claim 11, wherein each of the plurality of the image sensing systems performs intermediate imaging at least once in the middle of an optical path that extends to a final exit surface.

* * * * *

UNITED STATES PATENT AND TRADEMARK OFFICE
CERTIFICATE OF CORRECTION

PATENT NO.      : 6,590,704 B1
DATED           : July 8, 2003
INVENTOR(S)     : Kotaro Yano et al.

It is certified that error appears in the above-identified patent and that said Letters Patent is hereby corrected as shown below:

<u>Column 1,</u>
Line 65, "viewpoints" should read -- viewpoints with --.

<u>Column 2,</u>
Line 24, "build." should read -- built. --.

<u>Column 22,</u>
Line 41, "systems" should read -- systems with --.

Signed and Sealed this

Eighteenth Day of November, 2003

JAMES E. ROGAN
*Director of the United States Patent and Trademark Office*